US010101639B2

United States Patent
Pizzo et al.

(10) Patent No.: US 10,101,639 B2
(45) Date of Patent: Oct. 16, 2018

(54) LOW-PROFILE LENS MOUNT

(71) Applicant: HoudiniX LLC, Eastsound, WA (US)

(72) Inventors: Stephen G. Pizzo, Encino, CA (US); Peter Jarred Land, Los Angeles, CA (US); James H. Jannard, Las Vegas, NV (US); Hector Ortega, Pacific Palisades, CA (US)

(73) Assignee: HodiniX LLC, Eastsound, WA (US)

( * ) Notice: Subject to any disclaimer, the term of this patent is extended or adjusted under 35 U.S.C. 154(b) by 0 days.

(21) Appl. No.: 15/385,623

(22) Filed: Dec. 20, 2016

(65) Prior Publication Data
US 2017/0261838 A1 Sep. 14, 2017

Related U.S. Application Data

(63) Continuation of application No. 14/821,631, filed on Aug. 7, 2015, now Pat. No. 9,568,808.

(60) Provisional application No. 62/034,446, filed on Aug. 7, 2014.

(51) Int. Cl.
G03B 17/14 (2006.01)
G02B 7/02 (2006.01)

(52) U.S. Cl.
CPC ............. G03B 17/14 (2013.01); G02B 7/026 (2013.01)

(58) Field of Classification Search
CPC ..................................................... G03B 17/14
See application file for complete search history.

(56) References Cited

U.S. PATENT DOCUMENTS

| 3,559,542 | A | * | 2/1971 | Clapp | G03B 17/14 396/530 |
| 4,239,364 | A | * | 12/1980 | Doi | G03B 17/14 359/828 |
| 4,659,203 | A | | 4/1987 | Niwa et al. | |
| 5,005,948 | A | * | 4/1991 | Takahashi | G02B 7/023 348/355 |
| 8,019,216 | B2 | | 9/2011 | Jannard | |
| 8,068,168 | B2 | | 11/2011 | Haubmann | |
| 8,290,360 | B2 | | 10/2012 | Jannard | |
| 8,477,238 | B2 | | 7/2013 | Jannard | |

(Continued)

FOREIGN PATENT DOCUMENTS

| JP | 2003-057742 | 2/2003 |
| JP | 2007-286201 | 11/2007 |

(Continued)

OTHER PUBLICATIONS

"ArriPL", Wikipedia.org, https://web.archive.org/web/20131225170240/http://en.wikipedia.org/wiki/Arri_PL, web.archive.org indicates available online on Dec. 25, 2013, in 2 pages.

(Continued)

Primary Examiner — Noam Reisner
(74) Attorney, Agent, or Firm — Knobbe, Martens, Olson & Bear, LLP

(57) ABSTRACT

Disclosed is a housing for a portable handheld electronic device such as a cellphone. The device has a housing, having a left side and right side. At least one of the left side and right side is provided with integral surface features or surface structures to enhance gripping the cellphone, preferably along the entire length of the phone or within about the top half or one third of the phone.

15 Claims, 16 Drawing Sheets

(56) References Cited

U.S. PATENT DOCUMENTS

| | | | |
|---|---|---|---|
| 8,525,924 | B2 | 9/2013 | Jannard |
| 8,525,925 | B2 | 9/2013 | Jannard |
| 8,687,299 | B1 | 4/2014 | Sanford et al. |
| 8,773,581 | B2 | 7/2014 | Jannard |
| 8,830,607 | B2 | 9/2014 | Iinuma et al. |
| 8,913,179 | B2 | 12/2014 | Jannard |
| 9,019,397 | B2 | 4/2015 | Jannard |
| 9,628,679 | B2 | 4/2017 | Jannard |
| 9,712,728 | B2 | 7/2017 | Jannard |
| 2005/0141199 | A1 | 6/2005 | Chiou |
| 2006/0216023 | A1 | 9/2006 | Tokiwa |
| 2008/0002968 | A1* | 1/2008 | Arai ............... G03B 17/14 396/448 |
| 2009/0251423 | A1 | 10/2009 | Jung |
| 2009/0270135 | A1 | 10/2009 | Shoji |
| 2009/0291709 | A1 | 11/2009 | Lee et al. |
| 2010/0203929 | A1 | 8/2010 | Skagmo et al. |
| 2011/0309728 | A1 | 12/2011 | Diebel |
| 2012/0093494 | A1 | 4/2012 | Wang et al. |
| 2013/0002939 | A1 | 1/2013 | O'Neill |
| 2013/0077953 | A1* | 3/2013 | Kikuchi ............ G02B 7/102 396/530 |
| 2013/0265662 | A1 | 10/2013 | Araie |
| 2014/0071547 | A1 | 3/2014 | O'Neill |
| 2014/0098509 | A1 | 4/2014 | Tomoe |
| 2014/0128132 | A1 | 5/2014 | Cox |
| 2015/0076190 | A1* | 3/2015 | deSouza, Jr. ....... G03B 17/08 224/191 |
| 2016/0044148 | A1 | 2/2016 | Pizzo et al. |

FOREIGN PATENT DOCUMENTS

| | | |
|---|---|---|
| JP | 2010-145707 | 7/2010 |
| JP | 2011-081331 | 4/2011 |
| JP | 2011-095689 | 5/2011 |

OTHER PUBLICATIONS

"Epic Dragon Features", https://web.archive.org/web/20130726055056/http://www.red.com/products/epic-dragon#features, www.red.com, www.red.com/products/epic-dragon#features, www.archive.org indicates available online Jul. 26, 2013, in 3 pages.

"Epic Dragon Overview", https://web.archive.org/web/20130726055056/http://www.red.com/products/epic-dragon, www.archive.org indicates available online Jul. 26, 2013, in 3 pages.

"Fotodiox Pro Lens Adapter, Arri PL Mount lens to Sony E-Mount Mirrorless Camera such as NEX VG-10, FS-700", Amazon.com, http://www.amazon.com/Fotodiox-Adapter-PL-mount-Mirrorless/do/B008BBI4OE, document states that Fotodiox product was first available at Amazon.com on Jun. 13, 2012, in 6 pages.

"Meet the toughest, most durable smartphones money can buy", Jan. 24, 2014, www.phonearena.com.

"Micro Four Thirds System", Wikipedia.org, https://web.archive.org/web/20130424201648/http://en.wikipedia.org/wiki/Micro_Four_Thirds_system, web.archive.org indicates available on Apr. 24, 2013, in 19 pages.

"Sony E-mount", Wikipedia.org, https://web.archive.org/web/20131211063640/http://en.wikipedia.org/wiki/Sony_E-mount, web.archive.org indicates available online on Dec. 11, 2013, in 7 pages.

International Search Report and Written Opinion for PCT Application No. PCT/US2015/044285, dated Jan. 15, 2016.

Invitation to Pay Additional Fees and, Where Applicable, Protest Fee for PCT Application No. PCT/US2015/044285, dated Oct. 23, 2015.

Extended Search Report dated Jul. 12, 2018 for European Application No. 18172190.3, 8 pages.

* cited by examiner

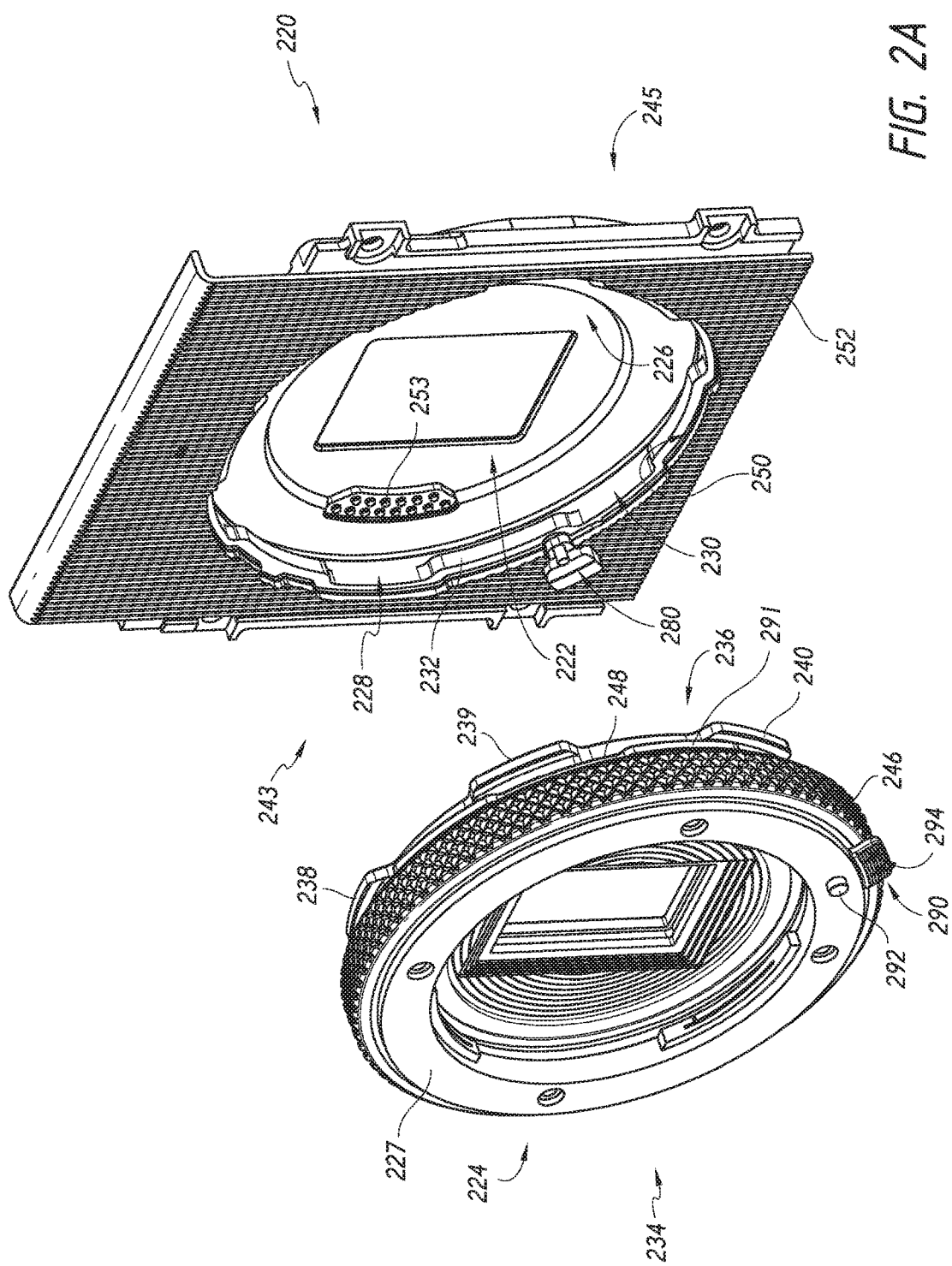

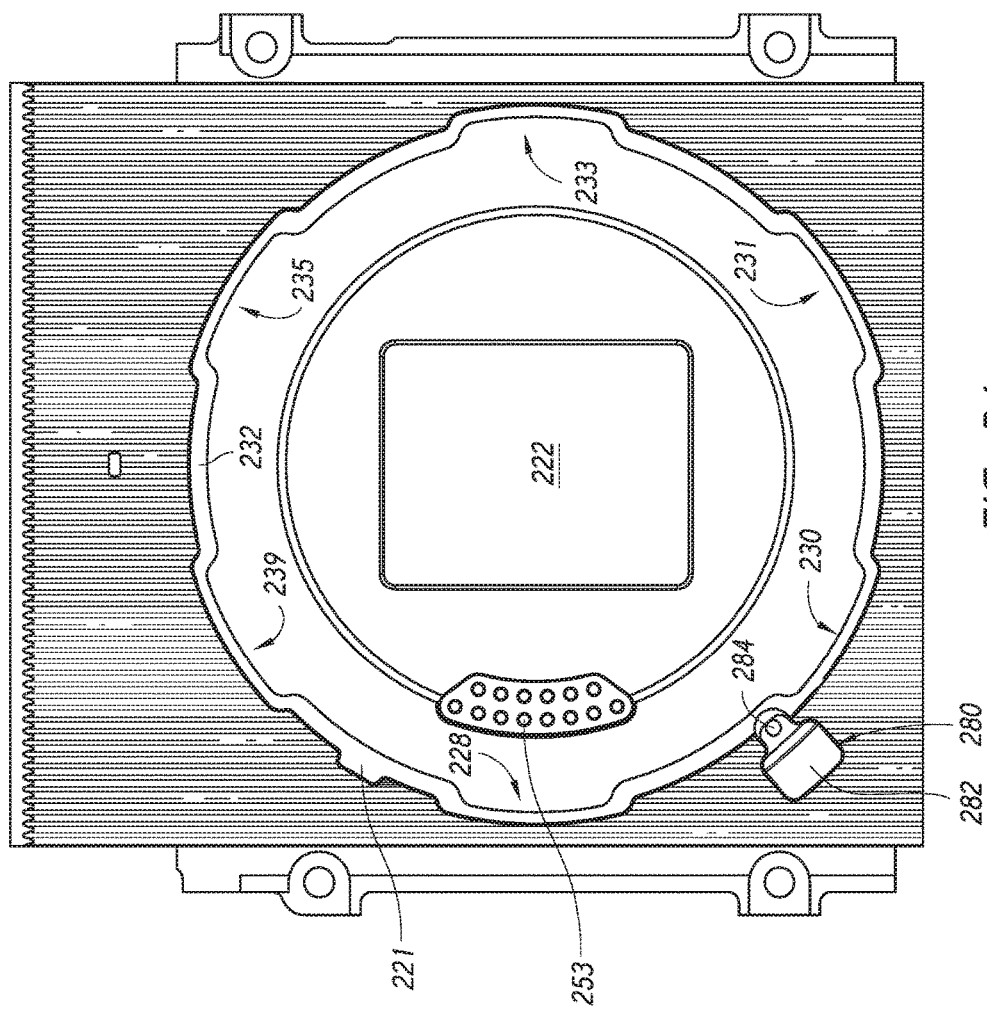

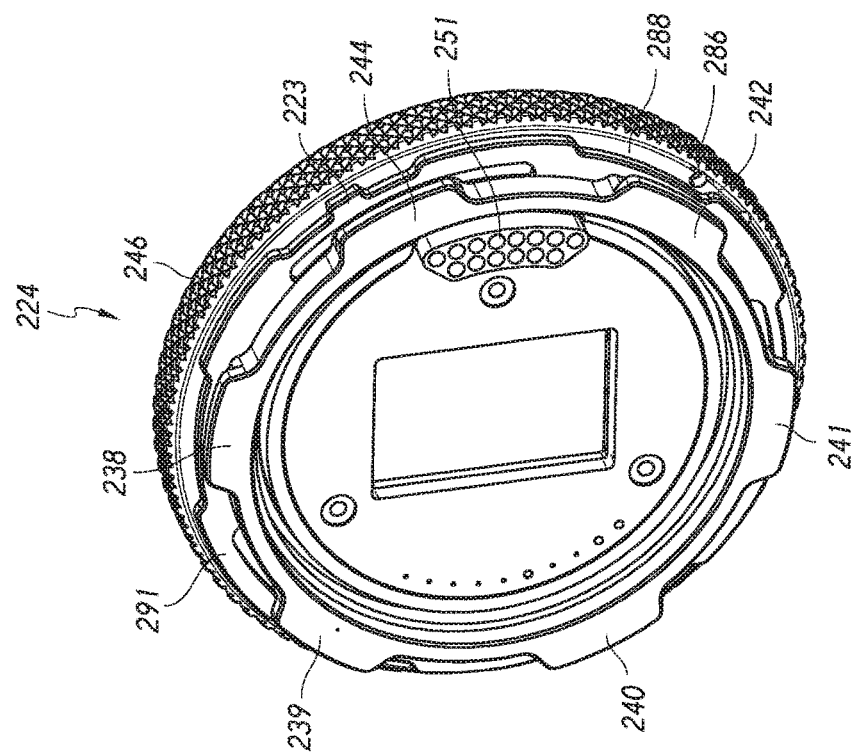
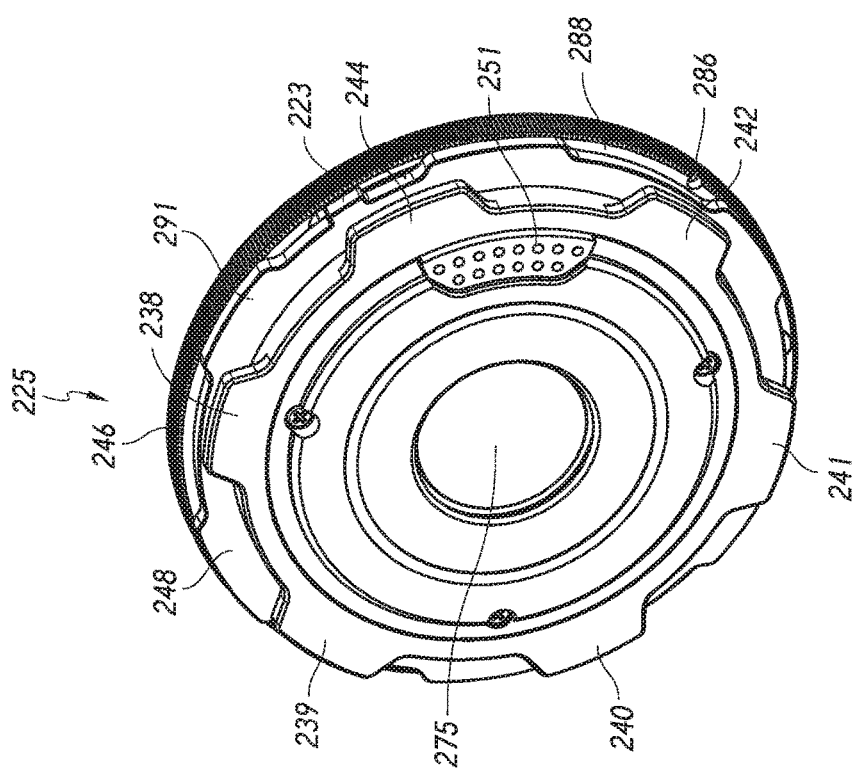
FIG. 3B

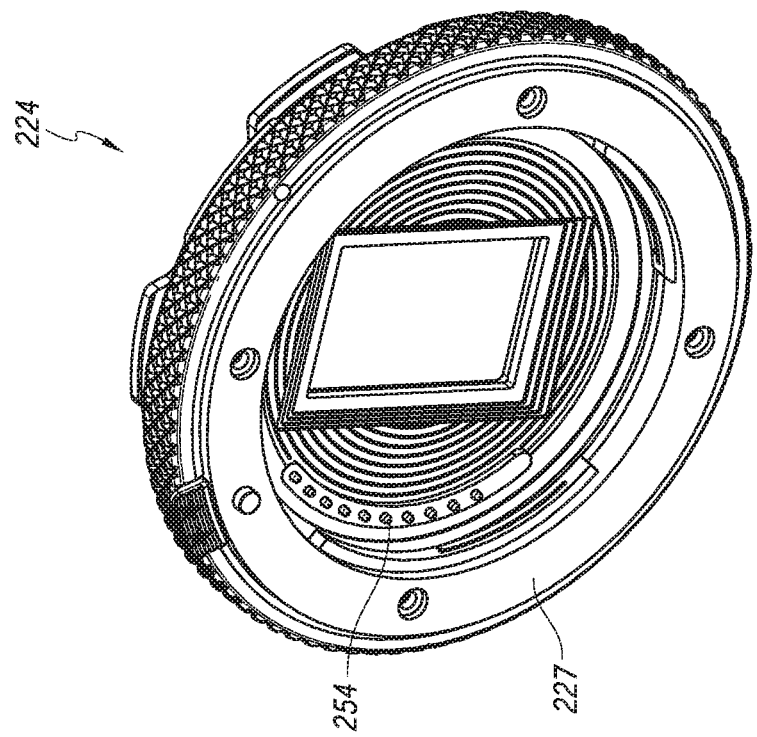
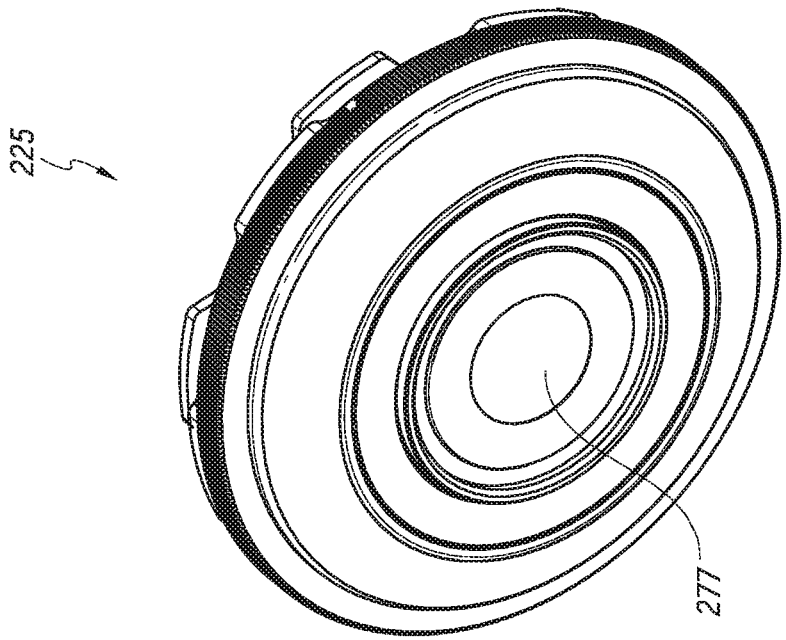
FIG. 3C

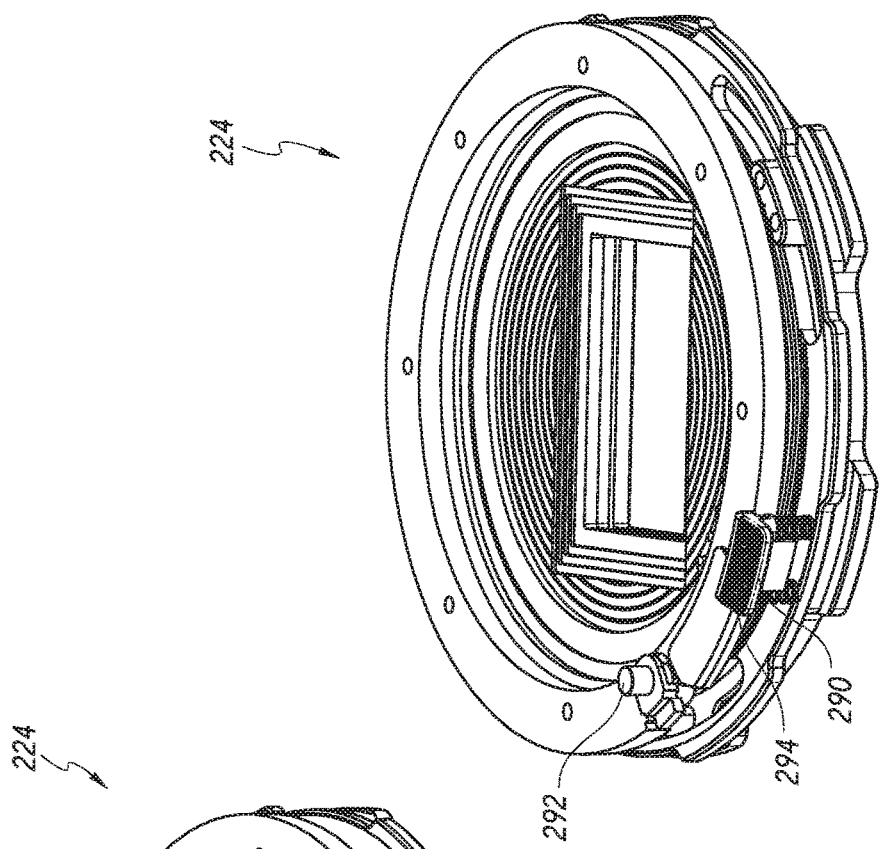
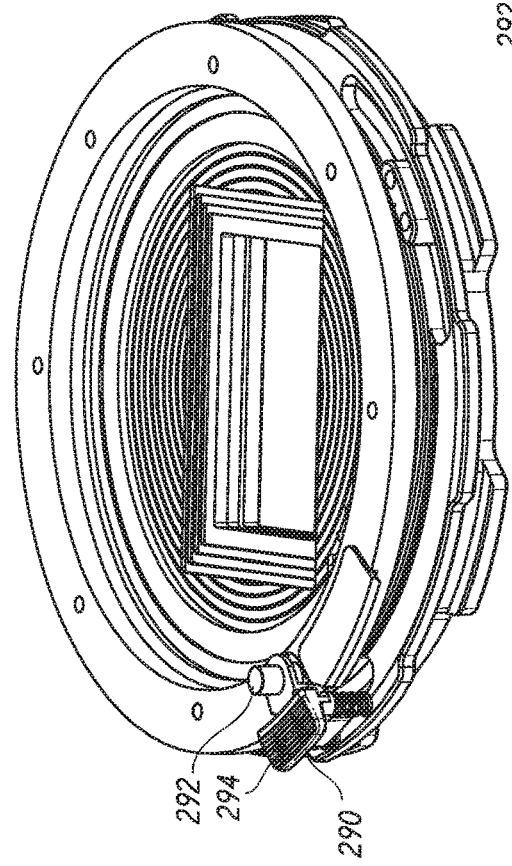
FIG. 7A
FIG. 7B

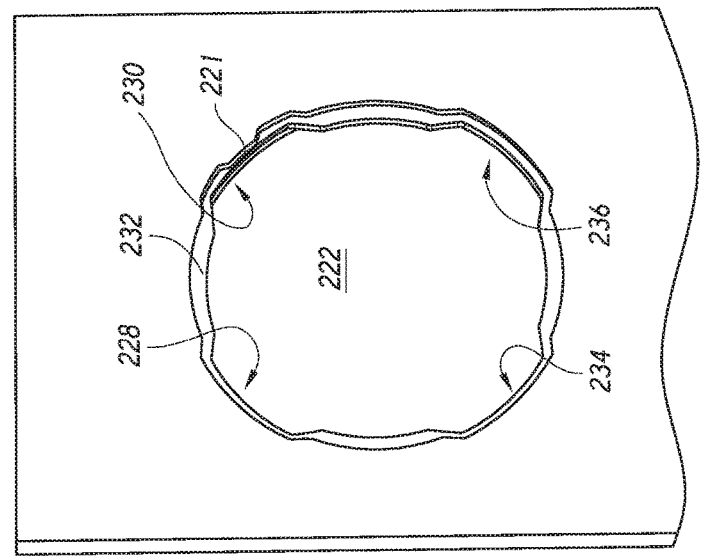
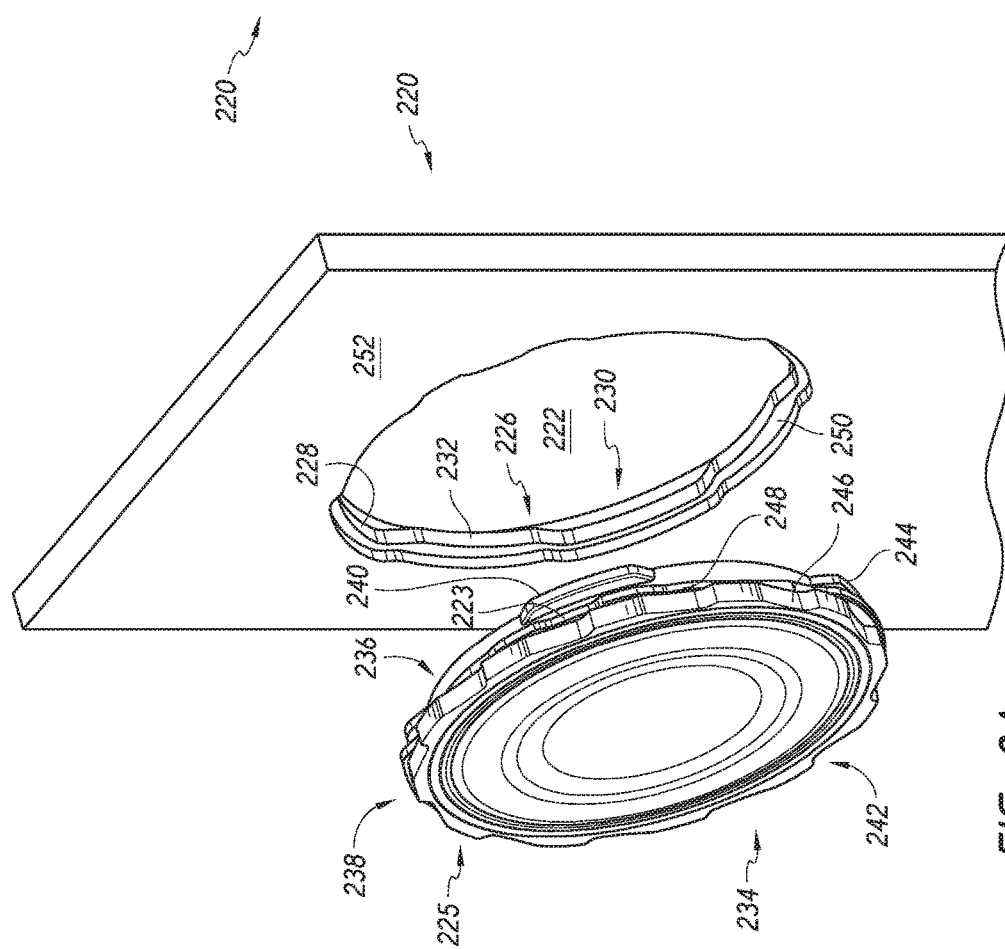

LOW-PROFILE LENS MOUNT

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

BACKGROUND

The capability of small form-factor, low-profile imaging devices continues to advance. For instance, certain point and shoot cameras, action cameras, as well as smartphones and other camera-equipped handheld electronic devices have begun to support still image and motion video capture at relatively high resolution levels and/or frame rates.

As just one example, the Samsung Galaxy S6 smartphone, which is about 142 millimeters (mm) tall, about 70 mm wide, and only about 7 mm inches thick, has a rear camera with a 16 megapixel (MP) sensor, capable of shooting UHD 4K resolution video (3840×2160 pixels) at 30 frames per second (30 fps). Such high-end capabilities and feature sets were previously only associated with bulkier professional level digital cameras, including digital single-lens reflex (DSLR) cameras and high-end (e.g., cinema grade) digital video cameras.

Despite these technological advances in some areas, todays more compact image devices are often not compatible with the types of high quality lenses typically used in conjunction with high-end DSLRs and digital video cameras.

SUMMARY

In some embodiments, a low profile, positive lock camera component, which is lockable and removable from a camera, is disclosed. The low profile, positive lock camera component includes: a stationary plate having a central aperture; a rotatable lock ring, carried by the stationary plate; and at least two rotatable projections coupled to the lock ring and carried on a camera side of the camera component that is opposite a lens side of the camera component. The rotation of the lock ring rotates the projections about a central axis and also advances the projections along the axis in the direction of the stationary plate.

The low profile, positive lock camera component of the preceding paragraph can include one or more of the following features: The stationary plate is a portion of a telephone housing. Each of the projections has a compression surface arranged parallel to and facing a compression surface of the stationary plate, and the compression surfaces of the projections move closer to the compression surface as the stationary plate as the projections advance along the axis in the direction in the direction of the stationary plate. The camera component is a camera lens. The camera component is a lens mount adapter. The stationary plate and the rotatable projections comprise a first interface of the lens mount adapter configured to allow for removable attachment of the camera component to a corresponding interface on an imaging device housing, and the camera component further comprises a second interface provided on the lens side of the camera component configured to allow for removable attachment of a camera lens thereto. The camera component is configured to fasten to a corresponding support on a housing of an imaging device, forming an effective flange focal distance of no more than about 25 millimeters. The effective flange focal distance is no more than about 20 millimeters. The effective flange focal distance is 18 millimeters. The effective flange focal distance is 19.25 millimeters. The first mounting interface is a male interface and the second mounting interface is a female interface. The low profile, positive lock camera component includes at least three rotatable projections. The low profile, positive lock camera component includes six rotatable projections centered on 60 degree spacing about the axis. The low profile, positive lock camera component includes four rotatable projections, centered on 90 degree spacing about the axis. The low profile, positive lock camera component includes at least two projections on the stationary plate. The low profile, positive lock camera component includes four projections on the stationary plate. The low profile, positive lock camera component includes six projections on the stationary plate. The rotatable projections are movable between a first position in which they are rotationally aligned with the projections on the stationary plate, and a second position in which they are rotationally offset from the projections on the stationary plate. The low profile, positive lock camera component includes a first plurality of electrical contacts on a camera side of the lens mount, and a second plurality of electrical contacts on a lens side of the lens mount. The first plurality of electrical contacts has a different configuration than the second plurality of electrical contacts. The lock ring is threadably coupled to the stationary plate.

In some embodiments, a support having an aperture configured to receive an optical element is disclosed. The support includes: a support front surface, a support rear surface and a thickness there between; a side wall of the aperture extending between the support front surface and support rear surface; and at least two arcuate flanges extending radially inwardly from the side wall into the aperture, each flange having a flange front surface which is recessed from the support front surface, and a flange rear surface which is recessed from the support rear surface. The support forms a female side of a positive lock mounting system.

The support of the preceding paragraph can include one or more of the following features: The support includes an optical element seating cavity having a periphery defined by a forward portion of the sidewall which extends from the support front surface to the flange front surfaces. The periphery of the seating cavity is contoured to accommodate a corresponding contoured periphery surface of the optical element. The contour of the periphery of the seating cavity includes a keying feature configured to allow for single-orientation insertion of the optical element into the aperture. The support comprises a surface on a camera. The support comprises a surface on a cell phone. The support is provided on a lens side of a lens mount adapter. The support comprises a plate configured for attachment to a cell phone. The support includes at least four arcuate flanges extending radially inwardly from the side wall into the aperture. The at least four arcuate flanges are substantially equally spaced about the periphery of the aperture. The support includes an alignment keying feature provided on the sidewall configured to provide for single-orientation insertion of the optical element.

In some embodiments, a support having an aperture configured to receive an optical element is disclosed. The support includes: a support front surface, a support rear surface and a thickness there between; a side wall of the aperture extending between the support front surface and support rear surface; and at least two arcuate flanges extending radially inwardly from the side wall into the aperture, each flange having a flange front surface which is recessed from the support front surface, and a flange rear surface which is recessed from the support rear surface. The support does not include a rotatable locking ring or a spring configured to assist in fastening the optical element to the support.

The support of the preceding paragraph can include one or more of the following features: The support does not implement a bayonet style mount. The support implements a female portion of a positive lock mount.

In some embodiments, an imaging system includes: a housing; at least one image sensor within the housing; a support carried by the housing and having an aperture configured to receive an optical element, wherein light emanating from outside the housing travels through the aperture and is incident on the image sensor. The support includes: a support front surface, a support rear surface, and a thickness there between; a side wall of the aperture extending between the support front surface and support rear surface; and at least two flanges extending radially inwardly from the side wall into the aperture. The support forms a female side of a positive lock mounting interface.

The imaging system of the preceding paragraph can include one or more of the following features: Each of the flanges has a flange front surface that is recessed from the support front surface, and a flange rear surface which is recessed from the support rear surface. A native flange focal distance of the imaging system is no more than about 15 millimeters. A native flange focal distance of the imaging system is no more than about 10 millimeters. A native flange focal distance of the imaging system is about 8 millimeters. The imaging system includes a lens component implementing the male side of the positive lock mounting interface and configured for removable attachment to the support. The lens component comprises a lens or a lens mount adapter. The lens component comprises a lens mount adapter, and an effective flange focal distance of the imaging system with the lens component attached to the support is no more than about 20 mm.

In some embodiments, a lens mount adapter, which is lockable and removable from a camera, is disclosed. The lens mount adapter includes: a rotatable lock ring extending circumferentially around a central aperture; a lens flange surface extending circumferentially around the aperture, the lens flange surface normal to a central axis extending through the aperture; a post movably mounted with respect to the lens flange surface; a button coupled to the lock ring. The button engages the post when the lock ring is rotated to a first position and is displaced from the post when the lock ring is rotated away from the first position.

The lens mount adapter of the preceding paragraph can include one or more of the following features: The button and post engage one another via a tongue and groove connection. Actuation of the button when the button is engaged with the post causes the post to move from an extended position in which the post extends beyond the flange surface to a retracted position in which the post does not extend beyond the flange surface. The post is mounted to a spring, the spring changing from a relaxed state to a compressed state when the button moves from the extended position to the retracted position. The lens mount adapter includes at least two rotatable projections coupled to the lock ring, and the rotation of the lock ring rotates the projections about a central axis and also advances the projections along the axis. The lens mount adapter includes a stationary plate threadably connected to the lock ring, and the rotation of the lock ring in a first direction advances the projections along the axis in a direction of the stationary plate, and rotation of the lock ring in a second direction advances the projections along the axis in a direction away from the stationary plate. The lens mount adapter is configured to allow for an effective flange focal depth of less than or equal to about 25 mm when attached to a corresponding support provided on a housing of an imaging device. The lens mount adapter is configured to allow for an effective flange focal depth of less than or equal to about 20 mm when attached to a corresponding support provided on a housing of an imaging device. The lens mount adapter is configured to allow for an effective flange focal depth of 18 mm when attached to a corresponding support provided on a housing of an imaging device. The lens mount adapter is configured to allow for an effective flange focal depth of 19.25 mm when attached to a corresponding support provided on a housing of an imaging device.

In some embodiments, a low-profile lens component includes: a rotatable lock ring extending circumferentially around a central aperture; a lens interface provided on a camera side of the lens component; a spring-mounted post protruding from a surface on the lens interface when in a spring-relaxed state; a mechanically actuatable control. The control is arranged with respect to the post such that actuation of the control when the lock ring is rotated to a first position overcomes a spring-force of the spring-mounted post, causing the post to retract so that it no longer protrudes from the surface on the lens interface. The control cannot be actuated to cause the post to retract when the lock ring is rotated away from the first position.

The low-profile lens component of the preceding paragraph can include the following feature: The surface on the lens interface is a flange front surface.

Further features and advantages of the inventions described herein will become apparent from the detailed description which follows when considered together the attached drawings and claims.

BRIEF DESCRIPTION OF THE DRAWINGS

FIG. 2A is a perspective view of a lens mount adapter, spaced apart from a support of an imaging device, in accordance with certain embodiments.

FIG. 3A is a front elevational view of an aperture in the support of FIGS. 2A-2B, in accordance with certain embodiments.

FIGS. 3B-3C show back and front perspective views, respectively, of the lens mount adapter shown in FIG. 2A and the lens shown in FIG. 2B.

FIG. 7A shows a perspective cut-away views of a lens mount adapter including a lens safety release mechanism, showing the release mechanism when the rotational lock ring (not shown) is in a first rotational position, in accordance with certain embodiments.

FIG. 7B shows a perspective cut-away view of the lens mount adapter of FIG. 7A, showing the release mechanism when the rotational lock ring (not shown) is in a second rotational position.

FIG. 8A shows a perspective another embodiment of a lens, spaced apart from another embodiment of a support of an imaging device, in accordance with certain embodiments.

FIG. 8B shows a front elevational view of the support of shown in FIG. 8A.

DETAILED DESCRIPTION

Figure 1A:
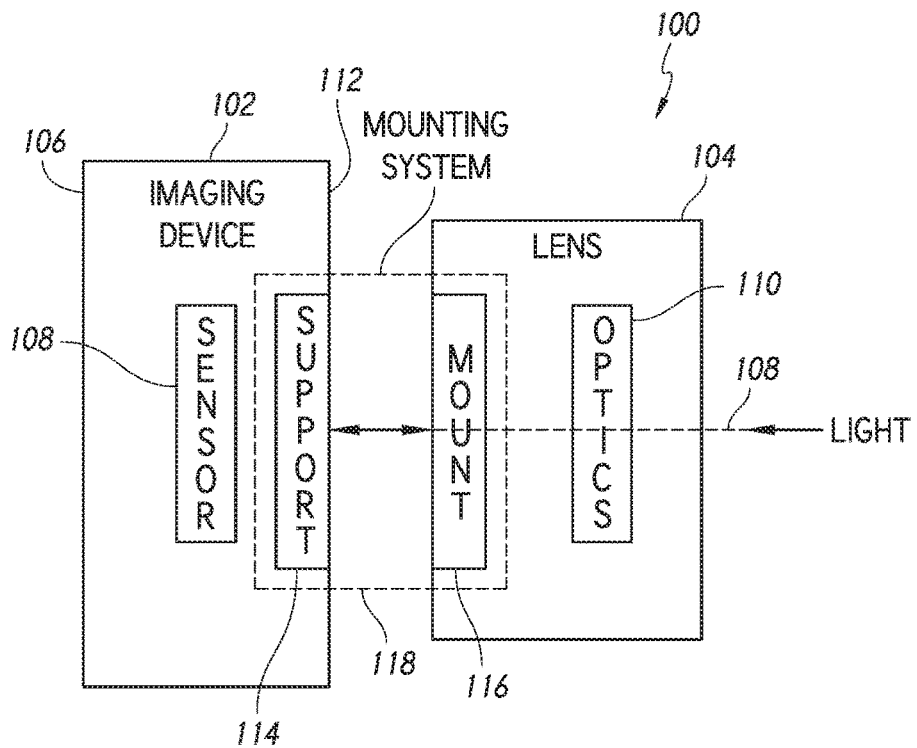
FIGS. 1A-1B show examples of imaging systems incorporating mounting interfaces, in accordance with certain embodiments.

FIG. 1A illustrates an imaging system 100, which includes an imaging device 102 and a detachable lens 104. The imaging device 102 can be a hand-held electronic device such as a digital camera or a camera-equipped cellphone. The imaging system 100 implements a mounting system 118 which, as will be discussed in more detail, can be an inverted positive lock (PL) mounting system provide a low-profile similar to a conventional bayonet type mounting system, while providing the robust clamping of a PL mount. The inventions herein are applicable to any of a variety of handheld electronic devices including camera-equipped devices with or without cellphone functionality, such as digital still and motion cameras, smartphones, personal navigation devices, mobile internet devices, hand-held game consoles, or devices having any or a combination of the functions discussed in connection with FIG. 9, below.

The imaging device 102 includes a housing 106 and at least one image sensor 108 within the housing 106. The image sensor 108 is arranged within the housing 106 such that when the lens 104 is attached to the camera housing 106, light traveling along an optical path of the imaging system 100 passes through optics 110 supported by the lens 104 and then through an aperture (not shown) provided on a front surface 112 of the housing 106. The optics 110 can include one or more refractive pieces of glass, for example, arranged to provide focus and/or zoom.

The image sensor 108 can be any type of video sensing device, including, for example, but without limitation, CMOS, CCD, vertically-stacked CMOS devices such as the Foveon® sensor, or a multi-sensor array using a prism to divide light between the sensors. For instance, the camera includes a capability for capturing still images with various and/or adjustable resolutions and aspect ratios for example but without limitation, as high as 6144×3160 pixels or higher with aspect ratios such as 2:1, 2.4:1, 16:9, etc, and a capability for capturing motion images at resolutions up to about "6K" or higher including for example, but without limitation, 6K (2:1, 2.4:1), 5K (Full Frame, 2:1, 2.4:1 and Anamorphic 2:1), 4.5K (2.4:1), 4K (16:9, HD, 2:1 and Anamorphic 2:1), 3K (16:9, 2:1 and Anamorphic 2:1), 2K (16:9, 2:1 and Anamorphic 2:1), 1080p RGB (16:9), 720p RGB (16:9) and other resolutions and formats, depending on the size of the image sensor used in the imaging device 102 and the capacity of the supporting electronics. Additionally, the device 102 can be configured to include a number of compression options, including compressed raw mosaic image sensor data, compressed fully rendered video data and uncompressed video data. An onboard memory preferably comprises a capacity of at least about 64 GB, and, in various implementation, at least about 128 GB, 256 GB, or 512 GB. In some embodiments, the memory can be attached to a separate recording unit that is directly or indirectly removably attachable to the housing 106. Where imaging device 102 is a phone, it can include a slot or cavity for receiving at least one, and preferably two or more SIM cards, to enable the phone to receive two or more phone numbers.

Where the imaging device 102 is a phone, it can include two cameras, such as one facing outwardly from the front of the phone and one facing outwardly from the rear of the phone. In one embodiment, the illustrated sensor 108 forms part of the camera that faces outwardly from the rear of the phone.

The imaging device 102 also includes a support 114, which is configured to engage and disengage with a corresponding mount 116 provided on the lens 104 during respective attachment and detachment of the lens 104 from the camera body 106. The support 114 and the mount 116 together form a mounting system 118. According to certain embodiments, the mount 116 is a male oriented interface including a rotatable lock ring and one or more rotatable flanges for securing a positive lock with the female oriented support.

Figure 1B:
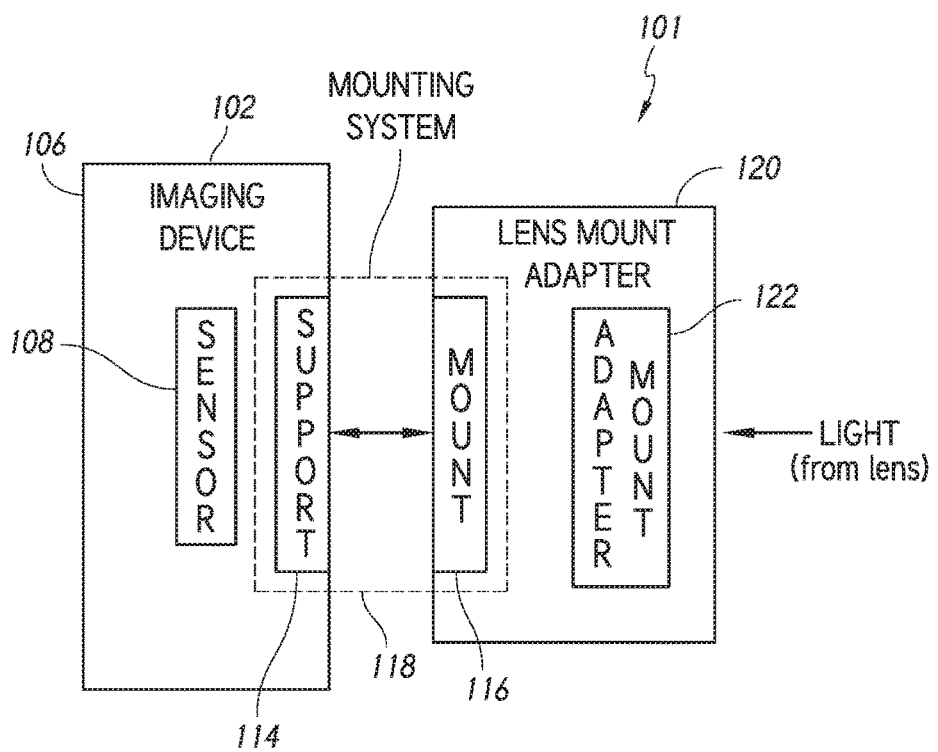

In another embodiment of an imaging system 101, shown in FIG. 1B, the mount 116 of the mounting system 118 is implemented on a lens mount adapter 120 instead of a lens 104. The lens mount adapter 120 incorporates an adapter mount 122 on a lens side of the adapter 120, allowing for the use of a wide variety of lenses and corresponding lens mount types with the imaging system 101. In this manner, imaging systems incorporating the mounting system 118 can optionally be used with a wide variety of different lenses. For instance, due to the non-standardization of lens mounts among the various lens manufacturers, adapters 120 are contemplated to implement a third party mount 122 so as to adapt to any of the following lens mounts: Pentax Q-mount; D-mount (8 mm movie cameras); CS-mount (surveillance cameras); Nikon 1-mount; C-mount (Bolex, Eclair and Bell & Howell); Fujifilm X-mount; Canon EF-M-mount; Sony E-mount; Sony FZ-mount; Micro Four Thirds System; Samsung NX-mount; RED ONE interchangeable mount; Leica M-mount; M39 (Leica) Screwmount; Olympus PEN F; Contax G-mount; Contax RF-mount; Nikon S-mount; Olympus Four Thirds System; Konica AR-mount; Canon FL-mount; Canon FD-mount; Start (Soviet SLR) Minolta SR-mount; Fujica X-mount; Canon EF mount; Canon EF-S-mount; Praktica B-mount; Signa SA-mount; Minolta/Konica Minolta/Sony A-mount; Pentax K-mount; M42; Contax C/Y-mount; Olympus OM-mount; Nikon F-mount; Leica R-Complementary mount; Sony B4-mount; Contax N-mount; Arri STD; Arri B; Arri PL; T-mount; Panavision PV-mount; OCT-19; Mamiya 645; Contax 645; Pentax 645; Hasselblad 2000 & 500; Pentax 6×7. Lenses having any of the foregoing mounts may be directly mountable to a complementary mount onto the adapter mount 122.

In certain other embodiments not illustrated in FIGS. 1A-1B, the lens mount adapter 120 is an intermediate adapter in that it does not actually include the adapter mount 122 or directly attach to a lens. Instead, the intermediate adapter includes an interface provided on a lens side of the adapter and that is configured to attach to a second lens mount adapter. The second lens mount adapter would include a lens mount of the desired type. An example of such a configuration is shown and described with respect to FIGS. 6D and 6E below.

In yet further implementations, the mounting system 118 can be implemented such the support 114 is provided on an intermediate component in the optical path instead of being provided on the housing 106 of the imaging device 102. For instance, the support 114 can be provided on the lens side of a lens mount adapter, while the camera side of the lens mount adapter would include a different type of mount, configured to engage with a corresponding interface on the camera or other imaging device.

The lens mount adapter 120 can further include a lens release mechanism for preventing unwanted detachment of a lens from the adapter 120. As will be described in further detail herein, the lens release mechanism can include a button arranged on a rotating lock ring of the adapter, where positioning the button on the lock ring maintains a low-profile of the adapter and allows for reduced flange focal distances. Rotation of the lock ring moves the button from a first position in which it engages with a lens release pin (e.g., via a tongue and groove mechanism) to a second position in which it decouples from the release post.

The mounting systems described herein according to some embodiments can be implemented on a camera-equipped contoured cellphone such as any of the cellphones described in U.S. patent application Ser. No. 14/247,160, titled "Cellphone With Contoured Surfaces", filed on Apr. 7, 2014 (the '160 application), and which is hereby incorporated by reference herein. For instance, any of the supports described herein, including the supports 114 of FIGS. 1A-1B and the support 220 of FIGS. 2A-2B can be implemented on a rear surface of one of any of the contoured profile cellphones described in the '160 application. The inverted positive lock mounts described herein can allow for the attachment of relatively large, heavy lenses, either directly to the support, or via the use of the lens mount adapters described herein, and the contoured profile can provide a grip that is particularly useful when handling the cellphone under the added bulk of such lenses.

Lens Mount System Examples

Figure 2B:
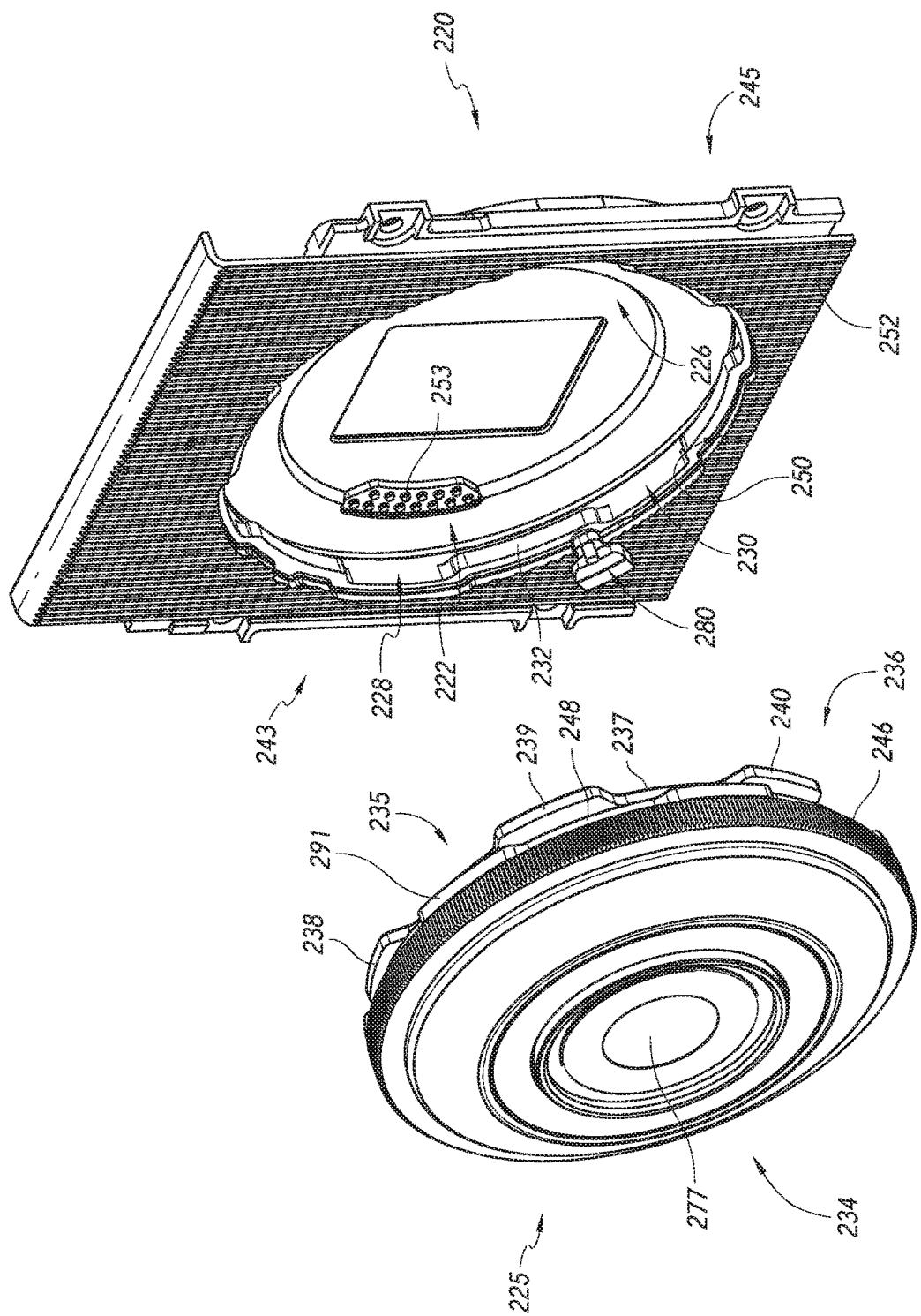
FIG. 2B is a perspective view of a lens spaced apart from a support of an imaging device, in accordance with certain embodiments.

FIGS. 2A-2B respectively illustrate an lens mount adapter 224 and lens 225 that may be utilized with a handheld imaging device, such as the imaging device 100 of FIG. 1. For instance, the lens 225 of FIG. 2B may be the lens 104 of FIG. 1A, and the lens mount adapter 224 of FIG. 2A may be the lens mount adapter 120 of FIG. 1B. Moreover, the support 220 shown in FIGS. 2A and 2B may be the support 114 shown in FIGS. 1A-1B, and can be provided on or form at least a portion of the front surface of a camera or other imaging device.

Where the support 220 is provided on an imaging device, it may be referred to as a native or built-in lens mount of the imaging device. For instance, the support 220 may be provided on or otherwise form at least a portion of the housing of a cellular phone, or a wall on a camera body. The support 220 is provided with a central aperture 222, typically aligned with the optical axis of the assembled camera or other imaging device. The support 220 can also be a plate such as for removable attachment to a camera, cellphone, or other imaging device.

Referring to FIG. 2A, the support has an aperture 222 configured to removably receive the lens mount adapter 224 or other compatible optical component. In general, any of a variety of complementary engagement structures may be provided on the periphery of the aperture 222 and a corresponding periphery of the lens mount adapter 224 or other compatible optical component. The complementary engagement structures preferably allow the lens mount adapter 224 to be securely connected to the support 220, but also be removable. As will be discussed further, the aperture 222 can further be configured to removably receive other optical components having a similar engagement structure for attachment to the support, such as a lens 225 (FIG. 2B), or an intermediate lens mount adapter configured to removably receive a lens mount (FIGS. 6D-6E).

Lens mount adapter 224 may be provided with a first set of complementary engagement structures for attachment to the support 220, and a second set of engagement structures configured to removably receive a conventional, commercial lens. The lens mount adapter 224 is considered to have a lens side 234 which contains a mount for a lens. While the illustrated lens mount adapter 224 is configured for attachment to a lens having a Sony E-mount interface, the lens mount adapter 224 can in various embodiments be configured for attachment to a lens having a different mount interface type, including one of any of the lens mounts described herein. Referring now to FIG. 2B, the lens side 234 of the lens 225 contains lens optics, which can include one or more pieces of refractive glass designed to provide focus and/or zoom. For instance, FIG. 2A shows a front surface of a front most optical element 277 of the lens 225, and FIG. 3B shows the back surface of a rear-most optical element 275 of the lens 225.

A camera side 236 opposes the lens side 234, and, although referred to as a camera side, it is understood that this is a directional reference only as the mount adapter 224 may be attached to any of a variety of support structures. For reference purposes, the support 220 is referred to as having a lens mount side 243 and opposing sensor side 245.

Referring to FIGS. 2A and 2B, the aperture 222 is provided with a contoured peripheral edge 226. At least a first recess 228 extends in a radial outward direction from an axis extending through the center of the aperture 222. In the illustrated embodiment, a second recess 230 is circumferentially separated from the first recess 228 by a first support flange 232. The peripheral edge 226 may be provided with two or three or four or five or six or seven or eight or more recesses similar to recess 228, such as, referring to FIG. 3A, third, fourth, fifth, and sixth recesses 231, 233, 235, 239, and an equal number of intervening flanges 232.

Referring to FIG. 2A, the camera side 236 of the lens mount adapter 224 includes at least a first rotating mount flange 238 dimensioned such that the lens mount adapter 224 can be positioned within the aperture 222 with the rotating mount flange 238 passing through one of the recesses in of the peripheral edge 226 of the aperture, such as the first recess 228. In the illustrated embodiment, the lens mount adapter 224 is provided with six rotating mount flanges 238, 239, 240, 241, 242, 244 (FIG. 3B), circumferentially spaced approximately equal distance around the periphery of the lens mount adapter 224. Typically, the lens mount adapter 224 will be provided with a number of rotating mount flanges that is equal to the number of recesses 228 provided on the support 220. Referring again to FIG. 3A, the mounting system can include an alignment or keying mechanism. For instance, the periphery 226 of the support 220 can in some embodiments including the illustrated embodiment further include an alignment notch 221 or other alignment feature. The notch 221 is shaped such that a corresponding to alignment flange 223 provided on the surface plate 248 can pass through the alignment notch 221 upon insertion of the lens mount adapter 224 into the aperture 222. This provides a single rotational orientation in which the lens mount adapter 224 can be successfully inserted into the aperture 222. In other embodiments, such as where the lens mount adapter 224 does not electrically connect with the imaging device, the alignment feature is not provided, and the illustrated lens mount adapter 224 can be inserted in any of six different rotational orientations. Other configurations of the alignment feature are possible, such as where the alignment notch is disposed on the lens mount adapter 224 and the alignment flange is disposed on the support 220. One alternative embodiment is shown in FIGS. 8A-8B, described below.

Figure 4:
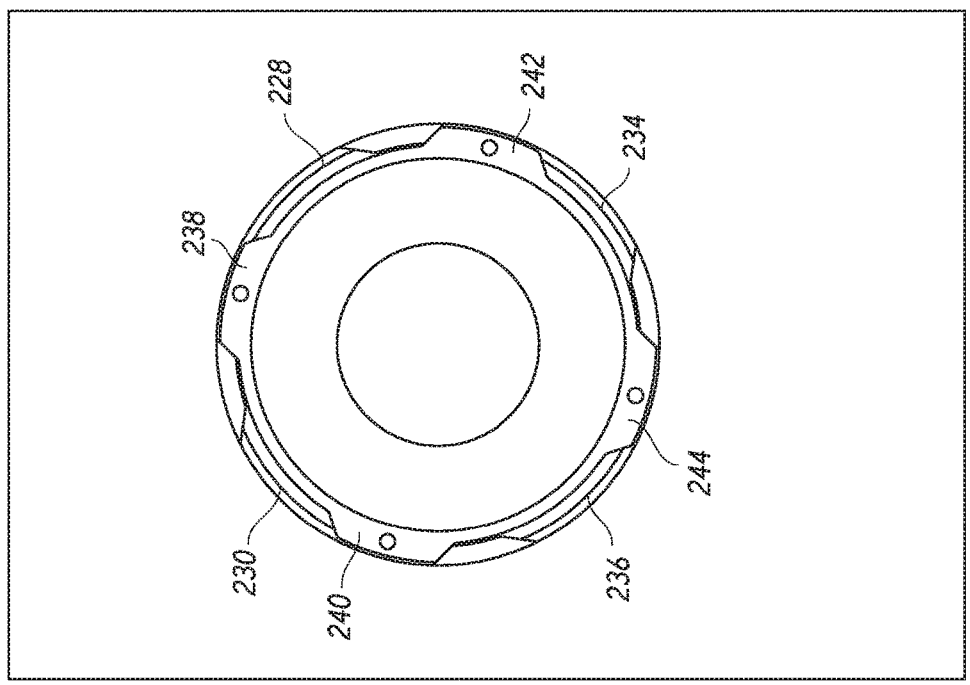
FIG. 4 is an elevational view of an optical component engaged in a corresponding aperture of a support of an imaging device.

Referring again to FIG. 2A, the lens mount adapter 224 is provided with a rotatable locking ring 246, which rotates relative to a surface plate 248 and causes the rotating mount flanges to rotate relative to the surface plate 248. The lens mount adapter 224 is mounted on the support 220 by advancing the lens mount adapter 224 along the optical axis such that each rotating mount flange passes through the corresponding recess of the support 220. Once the lens mount adapter 224 is seated on the support 220, rotation of the lock ring rotates each rotating mount flange such that it becomes positioned underneath (on the sensor side 245) of the corresponding support flange, such as support flange 232. The foregoing enables a secure, interference fit as can be seen, for example, in FIG. 4 which is a view from inside of a camera of an embodiment of a lens mount adapter having four rotating mount flanges. As seen therein, each of the four rotating mount flanges 238, 240, 242 and 244 have been rotated out of alignment with the corresponding recess 230, and into engagement with the corresponding support flange.

A further feature of the lens mount adapter 224 according to certain embodiments, including the embodiment illustrated in FIG. 2A, is a fixed surface plate 248. See, e.g. FIGS. 2A and 6A-6B. The fixed surface plate 248 is provided with a contoured or otherwise noncircular outer periphery, such that the plate 248 can seat within a complementary cavity of the support 220. In the illustrated embodiment, the outer periphery of the complementary cavity defines a seating surface 250, and is formed by the portion of the periphery of the aperture 222 that resides between the front (lens mount side) surfaces of the support flanges and the front surface 252 of the support 220. When the lens mount adapter 224 is fully inserted in the aperture 222, and the fixed surface plate 248 is therefore fully seated within the complementary cavity, the front (camera side 236) surface of the surface plate 248 abuts against an interfering surface of the support 220, which is formed at least partially by the front (lens mount side 243) surfaces of the support flanges 232, and which is spaced in the direction of the camera from the plate front surface 252. The outer periphery of the seating surface 250 can be shaped to correspond to the periphery of the surface plate 248, thereby preventing rotation of the fixed surface plate 248 with respect to the support 220. In one implementation of the invention, the seating surface 250 is recessed from the plate front surface 252 by a dimension that is approximately equal to the thickness of the fixed surface plate 248. In this manner, fixed surface plate 248 drops into the seating surface 250 and provides a flush interface with and smooth continuous surface with the plate front surface 252.

In one implementation, the locking ring 246 is connected to or with respect to the rotating mount flanges, such that rotation of the locking ring 246 in a first direction draws the rotating mount flanges in the direction of the lens mount adapter 224 (towards the lens side 234), and rotation of the locking ring 246 in a second direction advances the rotating mount flanges in the direction of the camera (towards the camera side 236). In this manner, as the locking ring 246 is rotated to rotationally advance the rotating mount flanges into the position illustrated in FIG. 4, the rotating mount flanges are simultaneously advanced in the direction of the fixed surface plate 248, thereby applying compression or pinching of the support flanges 232 between the corresponding rotating mount flanges and the fixed plate 248. This compression provides a secure positive lock (PL) between the lens mount adapter 224 and the support 220. For example, connection between the lens mount adapter 224 or other optical component and the support 220 will not be susceptible to substantial play due to vibrations or movement of the camera. As will be described further with respect to, e.g., FIG. 6C, in some embodiments including the illustrated embodiment, the locking ring 246 is directly coupled the rotating mount flanges and threadably connected to the fixed surface plate 248. In such configurations, rotation of the locking ring 246 causes movement of the locking ring 246 and rotating mount flanges along the optical axis with respect to the fixed surface plate 248, where the direction of the movement along the optical axis is determined by the direction of the rotation.

By way of summary of aspects of the mounting action of the lens mount adapter 224 and support 220 according to some embodiments, referring to FIGS. 2A-3B, the lock ring 246 is initially rotated to an unlocked position. In the illustrated embodiment, when the lock ring is in the unlocked position, the rotating flanges are aligned with corresponding fixed flanges 291 on the periphery of the fixed surface plate 248. The user aligns the rotating flanges, fixed flanges 291, and alignment tab 223 of the lens mount adapter 224 with the corresponding recesses 230 and the alignment notch 221 of the support 220, and inserts the lens mount adapter 224 into the aperture 222. As the lens mount adapter 224 is alignably inserted into the aperture 222 in the direction of the sensor, the rotating flanges pass through and clear the corresponding support recesses. Meanwhile the fixed plate 248 is oriented such that the contour of its periphery, including the keying feature, flanges, and recesses, are aligned with the corresponding contour defined by the periphery of the seating cavity 250. The adapter 224 continues to be axially inserted into the aperture until the front (camera side 235) surface of the fixed plate 248 contacts the front surfaces of the support flanges 232. At this point, the fixed plate is seated against the seating surface 250. The user now rotates the lock ring 246, causing the rotating flanges to begin to slide in behind (sensor side 245) the support flanges 232. At the same time, the rotation causes the rotating flanges to move towards the fixed plate 248, causing the support flanges 232 to be pinched between the rear surfaces (lens side 225) of the rotating flanges and the front surface (camera side 236) of the fixed plate 248. The lock ring 246 is rotated until achieving a locked position, such as the one shown in FIG. 4. To release the adapter 224, the lock ring 246 is rotated by the same amount in the reverse direction, and the adapter 224 is removed from the aperture 222.

Such a locking mechanism provides a reliable connection with very little play between the support 220 and the lens mount adapter 224, which can be particularly beneficial during motion shooting. Moreover, according to some embodiments including the illustrated embodiments, an optical component such as the lens 225 or lens mount adapter 225 (e.g., the male-oriented side of the mounting interface) includes the movable, mechanically active components involved in the locking function, such as the rotating lock ring 246 and the rotating flanges. In contrast, the support 220 (e.g., the female-oriented side of the mounting interface) according to certain such embodiments includes only mechanically passive, non-moving components involved in the locking function, such as the support flanges 232 and seating cavity 250. For instance, the support 220 according to various implementations does not include a spring such as a deflecting or coiled spring for providing a securing force between the lens component and the support, or a rotatable lock ring. Among other potential drawbacks, inclusion of a spring such as in a bayonet style lens mount could allow for play between the lens component and the support 220 during motion. Moreover, the front and back of the support flanges 232 are parallel, allowing for fixed-surface to fixed-surface pinching of the support flanges 232 between the corresponding surfaces of the fixed plate 248 and rotating flanges as described, with substantially no non-normal forces. Inclusion of a spring could create some degree of non-normal force, reducing the effectiveness of the lock. In alternative embodiments, a spring may be included to aid in the clamping force.

Figure 5A:
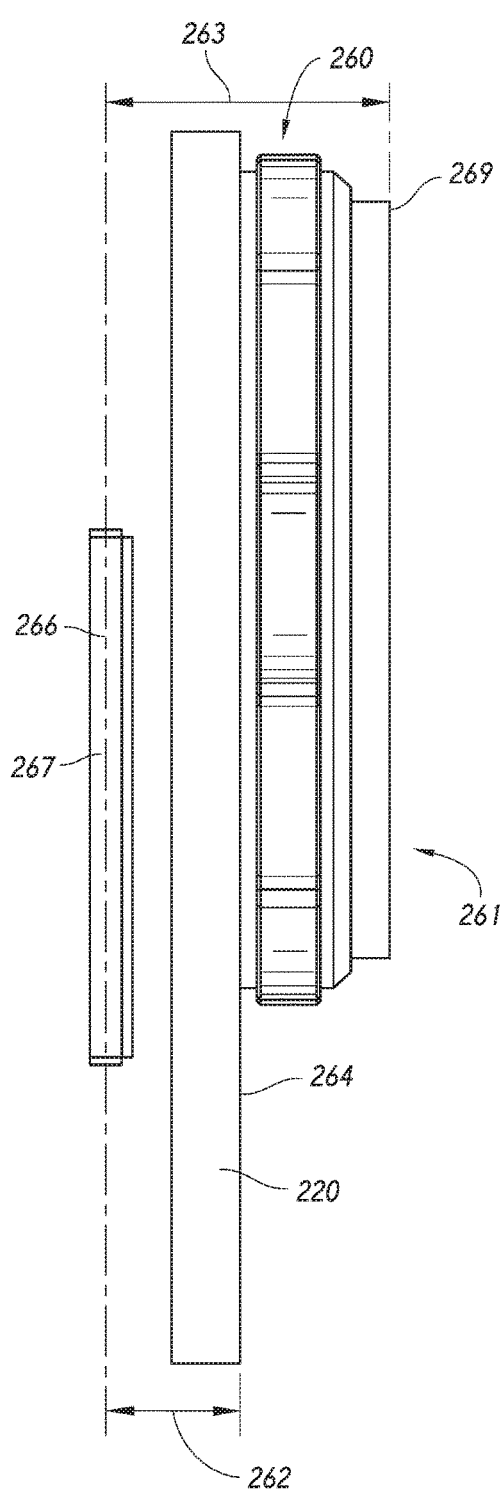
FIGS. 5A-5B are side elevational views of a low-profile lens and a Micro Four Thirds mount, respectively, connected to a support via an inverted positive lock (PL) mount configuration, according to certain embodiments.
Figure 5B:
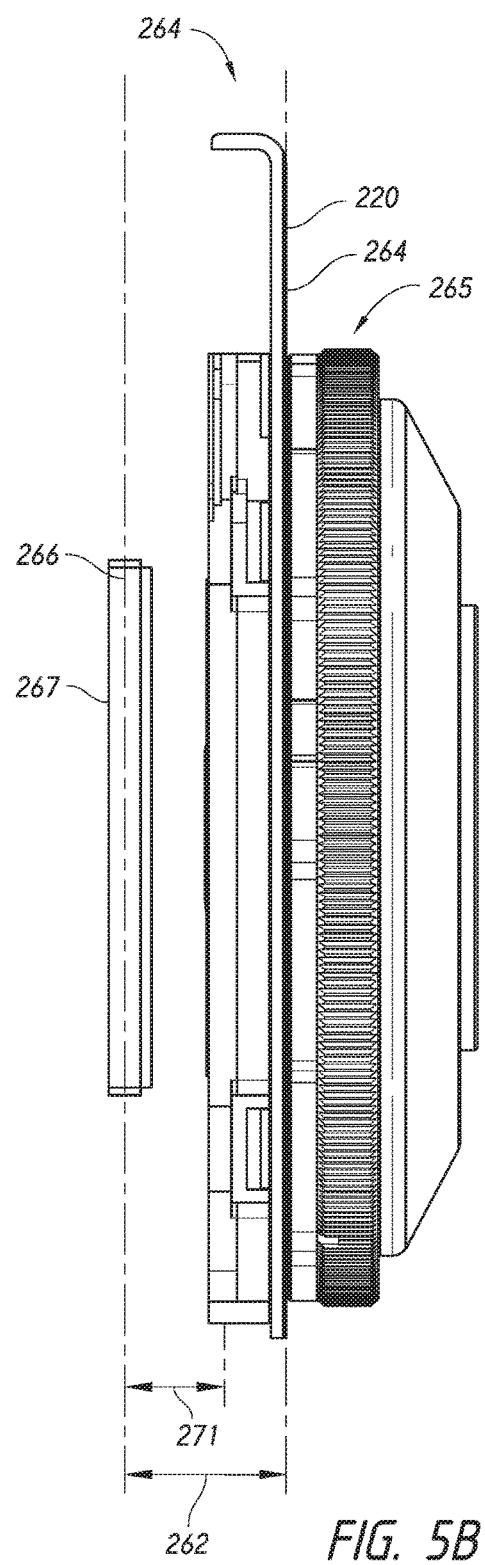

Referring now to FIG. 5A, there is illustrated a side elevational view of a lens mount adapter 260, such as an Micro 4/3 (MFT) adapter, mounted to a support plate 220. FIG. 5B shows a lens 265 mounted to a support plate 220. The mounting mechanism described herein enables a low stack height of a conventional bayonet type mounting system, yet provides the high clamping strength of a PL (positive lock) mount. The mount also enables a very shallow back focus, or flange focal distance 262.

Referring to FIGS. 5A and 5B, the native flange focal distance 262 of the mounting system can be measured from the flange front surface 264 of the support 220 to an image plane 266 formed by one or more image sensors 267. Referring briefly to FIG. 2A, the flange front surface the support 220 of FIG. 2A would comprise the substantially flat, contiguous face 252 of the support which is co-planar with the opening of the aperture 222, but would not include the button 280 or any other portions protruding from or recessed from the face. Referring again to FIGS. 5A-5B, the native flange focal distance 262 can range from less than 15 mm to less than about 12 mm, or to preferably less than 10 mm. In one embodiment, the native flange focal distance 262 is 8 mm. The lens mount adapter 260 of FIG. 5A includes an adapter mount 261, which can be a female Micro 4/3 bayonet-style mount, allowing for attachment of a lens having a male Micro 4/3 mount. With the adapter 260 attached, the effective focal depth 263 of the system can be measured between the image plane 266 and a lens mounting flange 269 of the adapter mount 261. The shallow native flange focal distance 262 enables the interchangeable use of a wide variety lenses on the camera, including lens those having mounting systems with relatively shallow flange focal distances (e.g., Sony E-mount at 18 mm or Micro 4/3 mount at 19.25 mm) as well those having significantly larger flange focal distance. For instance, lens mount adapters can implement mounting systems having flange focus depths ranging from less than 15 mm and preferably less than about 20 mm up to greater than 45 mm or greater than 50 mm as known in the art can be art, including mounting systems compatible with any of the commercially available lens mounts described herein.

The terms "back focus", "back focus distance", "flange focal distance", and "flange focal depth" are used interchangeably herein, and can generally correspond to a distance between a native mounting flange and an image plane (e.g., the distance 262 shown in FIGS. 5A and 5B) or, where a lens mount adapter is used, the distance between a mounting flange or surface of the adapter and the image plane (e.g., distance 263 shown in FIG. 5A). It can also be beneficial to reduce the distance between the rearmost portion of optics in the lens, such as a rear apex of a convex lens. This distance can depend on the design of the lens, and this distance in some cases may be less than the flange focal distance 262. For instance, referring to FIG. 5B, in some embodiments, when the lens 265 is inserted in the aperture, the apex of a rear-most optical element 275 (visible on the lens 225 shown in FIG. 3B) within the lens 265 can reside on the image sensor side of the support 220. This can result in a back of lens-to-image plane distance 271 that is less than the flange focal depth 262. In various embodiments, the back of lens-to-image plane distance 271 range from no more than about 15, 10, or 8 mm, to preferably no more than about 5 mm. In one embodiment, the lens-to-image plane distance 271 is about 2 mm, and the flange focal distance 262 is about 8 mm.

According to certain embodiments, the lens mount adapter 224 additionally maintains the opto-electro-mechanical functionality, by accommodating the signal/power pass through that many of the modern lens mount formats require. Alternatively, the mount can also function as a "dome" mount (opto-mechanical only). For this purpose, referring to FIGS. 3A and 3B, the camera side 236 of the lens mount adapter 224 and that of the lens 225 contain a plurality of electrodes 251 configured to match the pattern of the plurality of electrodes 253 provided on the imaging device (e.g., camera body or cellphone body) to which the lens mount adapter 224 will be attached. The alignment mechanism including the notch 221 and flange 223 can ensure proper connection between the electrodes 251 of the lens mount adapter 224 and the electrodes 253 of the imaging device. The lens side 234 of the lens mount adapter 224 contains a second plurality of electrodes 254 (FIG. 3C), such as pogo pins, for providing electrical communication with a paired lens. Thus, if the mount provided on the lens side of the adapter 224 is configured for mechanical fastening to a Sony E-mount lens or an MFT lens, the electrical connectors on the lens side of the mount will be configured to cooperate with the same E-mount or MFT lens, while the electrical connectors on the camera body side of the lens mount will correspond to the electrical connector pattern of the intended camera body.

Figure 6A:
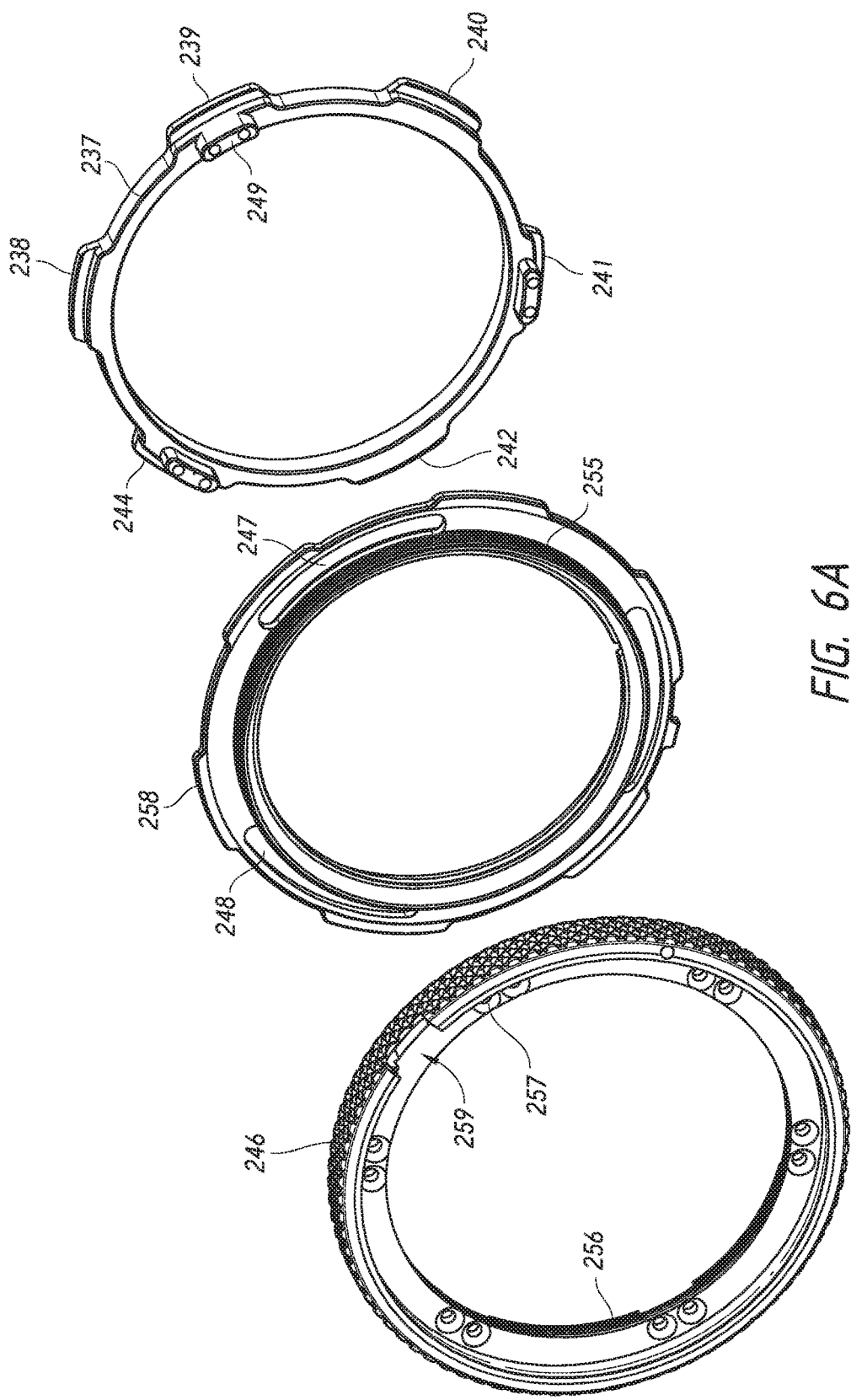
FIGS. 6A-6B show front and rear perspective exploded views, respectively, of the rotating lock ring, fixed flange ring, and rotating flange ring of the lens mount adapter shown in FIG. 2A.
Figure 6B:
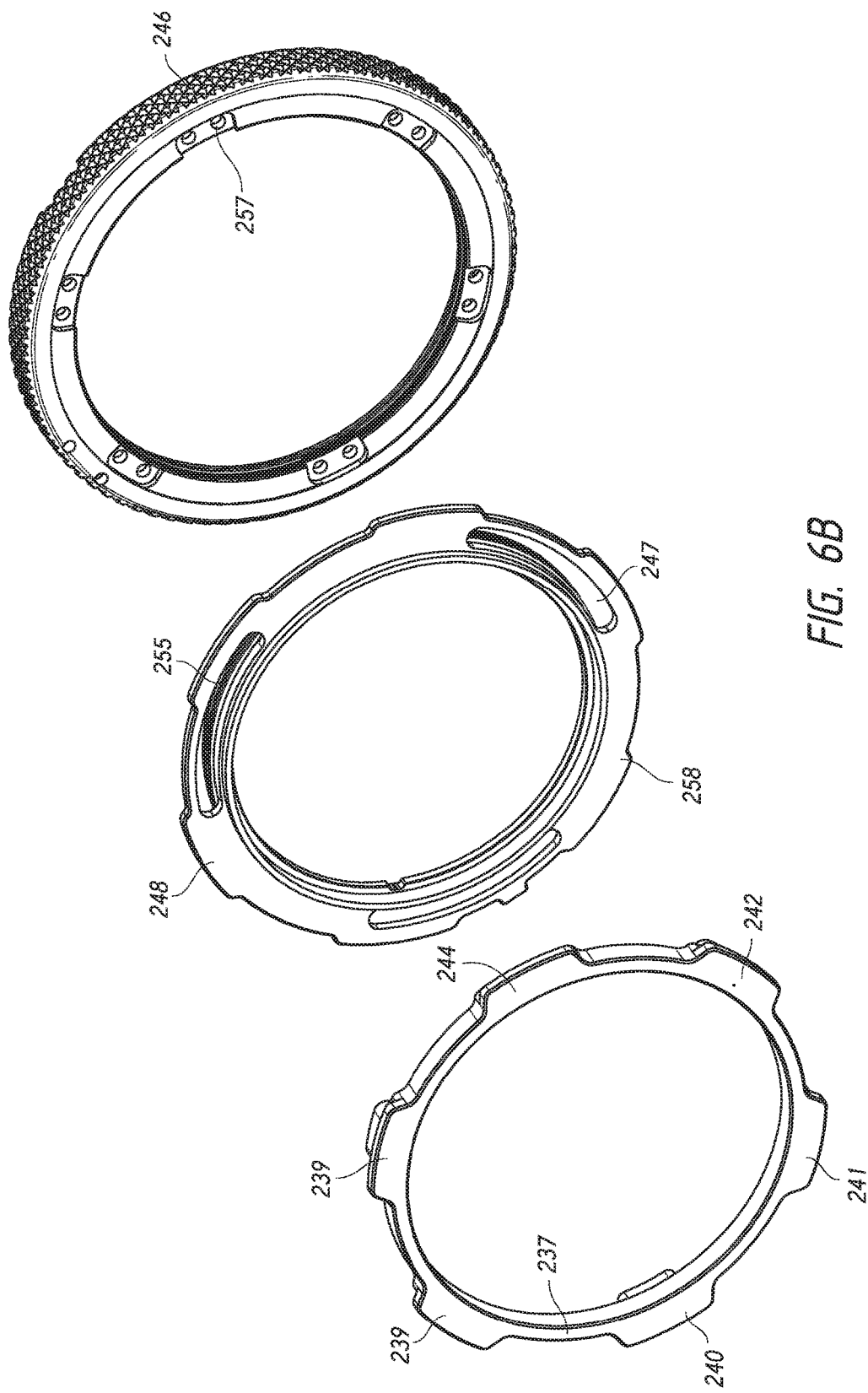

Turning now to FIGS. 6A and 6B, front and rear exploded perspective views are shown of a rotating lock ring 246, a fixed surface plate 248, and a rotating flange support ring 237 of the lens mount adapter 224 shown in FIG. 2A. Similar to the lock ring 246 and the rotating flange support ring 237, the illustrated fixed surface plate 248 is annular. The surface plate 248 additionally supports a set of fixed flanges 258. The rotating flange support ring 237 supports the rotating flanges 238, 239, 240, 241, 242, 244 and is configured to couple to the rotating locking ring 246. For instance, the illustrated support ring 237 includes a set of three tabs 249 which pass through corresponding slots 247 in the fixed surface plate 248. The tabs 237 are secured to the lock ring 246 via insertion of screws, bolts or other fasteners through the pairs of fastener openings 257 provided on the locking ring 246 and into corresponding female fastener holes provided on the tabs 249. Although three coupling tabs 249 are shown, one, two, or more than three tabs can be used depending on the embodiment. The lock ring 246 and the rotating ring 237 can be connected in other ways, depending on the embodiment, such as through a molded connection, or with an adhesive. As shown, the slots 247 included on the periphery of the surface plate 248 are elongate and curved along the periphery of the fixed surface plate ring 248. This not only allows the tabs 249 to pass through, thereby enabling connection of the lock ring 246 to the flange support ring 237, but also allows the joined lock ring 246/flange support ring 237 to rotate with respect to the fixed surface plate ring 248 during attachment and detachment of the lens mount adapter 224 from the imaging device. The fixed surface plate 248 supports a threaded annular surface 255 extending in the direction of the lock ring 246 from the support plate 248, and configured to mate with a corresponding threaded surface 256 provided on the interior periphery of the lock ring 246.

Figure 6C:
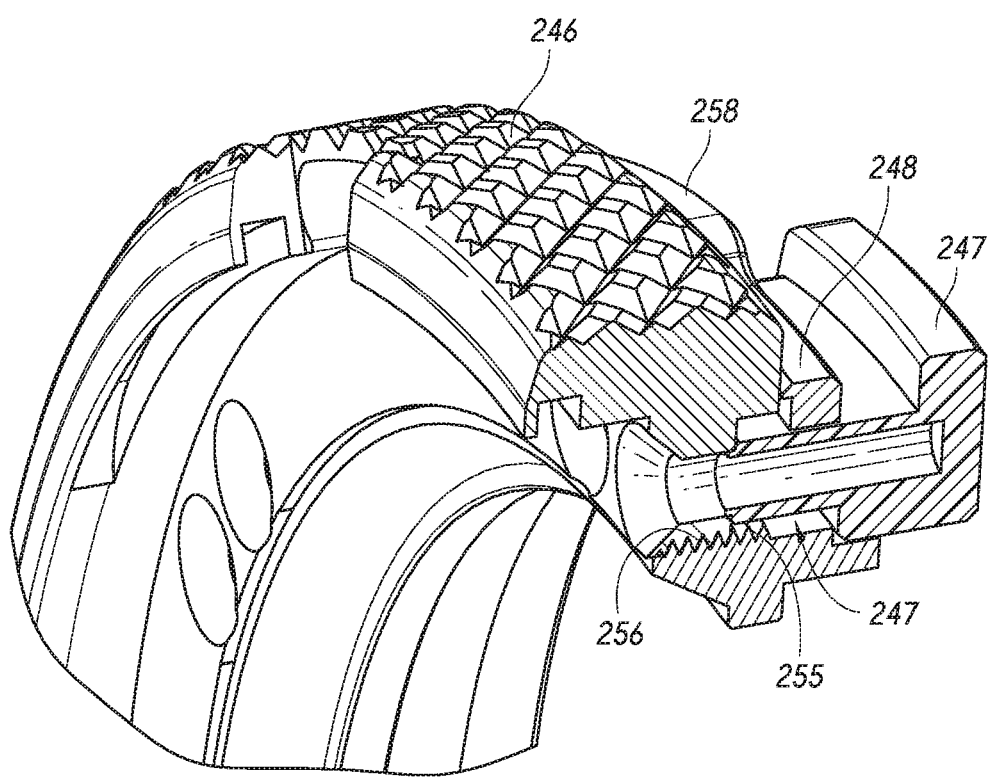
FIG. 6C is a cross-sectional view of the rotating lock ring, fixed flange ring, and rotating flange ring of the lens mount adapter shown in FIG. 2A, in an assembled configuration.
Figure 6E:
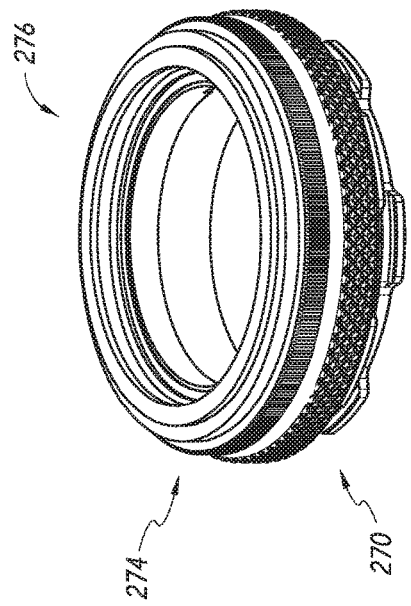
FIG. 6E shows an example of an intermediate lens mount adapter of FIG. 6D in an assembled configuration, with a second lens mount adapter attached thereto.
Figure 6D:
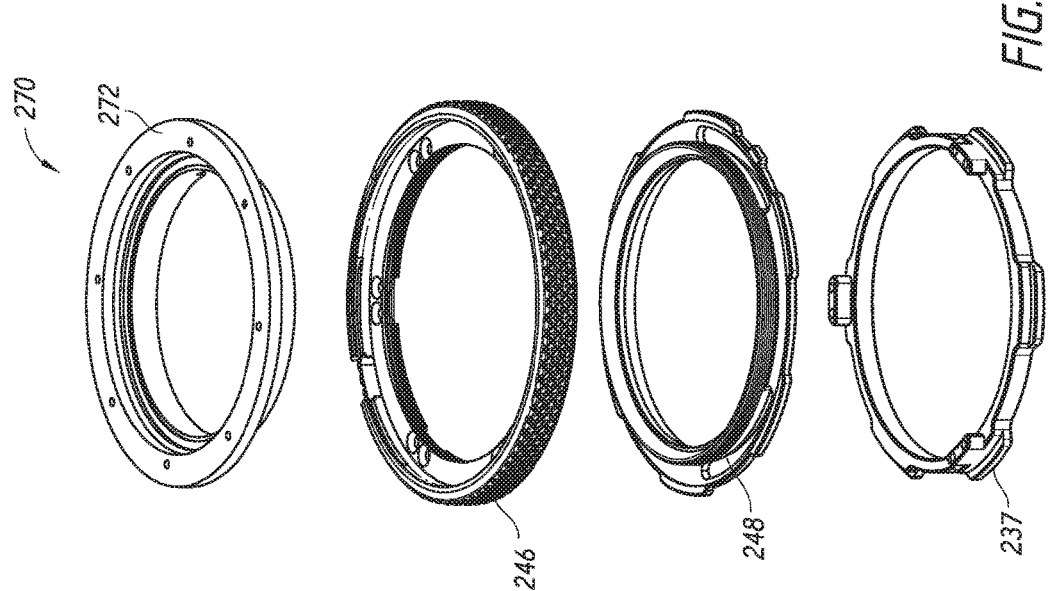
FIG. 6D shows an exploded view of an example of an intermediate lens mount adapter configured to receive a second lens mount adapter.

FIG. 6C shows a cross-sectional view of the lock ring 246, fixed surface plate ring 248, and rotating flange support ring 237 of FIGS. 6A-6B, in an assembled configuration. FIG. 6C shows the tab 249 of the rotating flange support ring 247 passing through the slot 247 of the fixed surface plate 248, and coupling the support ring 247 to the rotating ring 246. FIG. 6C also shows the connection between the threaded surface 255 the fixed surface plate 248 and the threaded surface 256 of the lock ring 246. Rotation of the locking ring 246 engages the threaded connection, resulting in movement of the locking ring 246 and flange support ring 247 along the optical axis relative to the fixed surface plate 248, where one of the locking ring 246 and the flange support ring 247 moves closer to the support plate 248, and the other moves farther from the support plate 248, depending on the direction of the rotation. Referring to FIGS. 2A, 6B, and 6C, this mechanism allows for compression of the lens mount side 243 of the flanges 232 of the support 220 between the lens side 234 of the flanges of the rotating flange support ring 237 and the camera side 236 of the fixed surface plate 248.

While FIGS. 6A-6C have been described with respect to the lens mount adapter 224, other optical components such as a lens can include similar components to those shown in FIGS. 6A-6B which function together to engage with the support 220 of an imaging device to provide positive locking functionality. For instance, the lens 225 shown in FIG. 2B includes a lock ring 246, fixed surface plate ring 248, and rotating flange support ring 237 that function in a similar manner. As another example, FIG. 6D shows an embodiment of a lens mount adapter 270 including a lock ring 246, fixed surface plate 248, and rotating flange support ring 247 similar to those shown in FIG. 6C. However, the lens mount adapter 270 is an intermediate adapter in that it does not directly attach to a lens, but instead includes a front ring 272 configured to accept a separate lens mount adapter. For instance, FIG. 6E shows the lens mount adapter 270 in an assembled configuration, and with a second lens mount adapter 274 installed thereon. The second lens mount adapter 274 includes a lens mount interface 276, which according to various implementations can implement any of the commercially available lens mount systems described herein, such as a Canon EF bayonet-style interface or a Nikon F-mount just to name two possibilities.

Release Mechanisms

As described, the optical components described herein such as the lens mount adapter 224, lens 225, and lens mount adapter 270 can be fastened to the support 220 via aligned insertion into the aperture 222, and subsequent rotation to secure a positive lock. In addition to the rotational locking function it can be desirable to further reduce the chances of accidental detachment of the optical component from the support 220. Thus, returning to FIGS. 2A, 2B, 3A, and 3B, a safety mechanism can be provided to prevent accidental detachment. The illustrated safety mechanism includes a button 280 provided on the support 220 including a landing pad 282 and a post or pin 284. Referring to FIG. 3B, the safety mechanism further includes at least one hole 286 provided on the lens mount adapter 224 and lens 225, on the rear/camera side 236 of the outer periphery of the lock ring 246. The hole 286 is shaped to accommodate the post 284, and as shown, is located on a portion 288 of the rear/camera side 236 of the lock ring 246 that is exposed by one of recesses in the fixed support plate 248. Referring now to FIGS. 3A and 3B, when a user aligns the flanges/recesses of the lens mount adapter 224 or other optical component with the corresponding flanges/recesses of the periphery of the support 220, as well as the alignment flange 223 of the lens mount adapter 224 with the alignment notch 221 of the support 220, and inserts the lens mount adapter 224 into the aperture 222, the post 284 of the support and hole 286 on the lens mount are out of alignment. In particular, the button 280 is spring-loaded, and when the user inserts the lens mount adapter 224, the portion 288 of the rear/camera side 236 of the lock ring 246 will contact the post 284, depressing the button, including the post 284. When the user rotates the lens mount adapter 224 into a positively locked, fastened position, the post 284 will eventually align with the hole 286, and the spring will urge the post 284 to extend into the hole 286, thereby preventing rotation and accidental detachment of the lens mount adapter 224. When a user desires to detach the lens mount adapter 224 or other optical component, the user presses the pad 282 of the button, causing the post 284 to retract from the hole 286, allowing rotation and detachment of the lens mount adapter 224 from the support 220.

It can also be undesirable for a lens to detach from the lens mount adapter 224. Thus, returning to FIG. 2A, the lens mount adapter 224 can include a safety mechanism for preventing unwanted detachment of a lens (not shown) from the lens mount adapter 224. The safety mechanism includes a button 290 or other control having a finger landing pad 294, and further includes a spring-loaded post or pin 292. The pin 292 is slidably mounted in a corresponding cavity of the lens mount adapter 224, where a hole in the flange front surface 227 of the lens mount adapter 224 defines an opening to the cavity. When in a spring-relaxed, extended position, the pin 292 extends beyond the opening of the cavity, beyond the front flange surface 227. Similar to the safety mechanism described above between the lens mount adapter 224 and the support 220, when the user inserts the lens in the lens mount adapter 224, the post 292 is initially depressed via contact with a rear flange surface of the lens. Then, following rotation of the lens to secure the lens to the lens mount adapter 224, the post 292 aligns with the hole provided on the lens, and the spring urges the post 292 into the hole on the lens, thereby prevents rotation of the lens and accidental detachment of the lens from the lens mount adapter 224.

The button 290 as shown in FIG. 2A is coupled to the post 292, and when a user wants to remove the lens, the user presses down on the landing pad 294 of the button 290, causing the pin 292 to retract from the hole. Eventually, the pin 292 is flush with or recessed with respect to front flange surface 227 of the lens mount adapter 224, allowing rotation and subsequent detachment of the lens from the lens mount adapter 224.

Figure 7D:
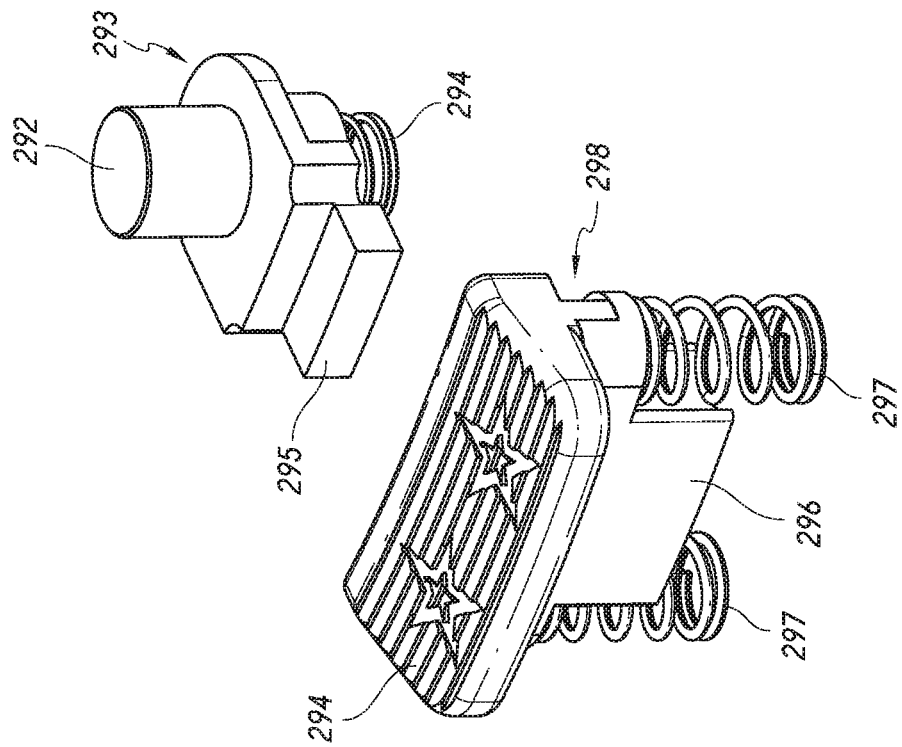
FIGS. 7C-7D show components of the lens safety release mechanism of FIG. 7A.
Figure 7C:
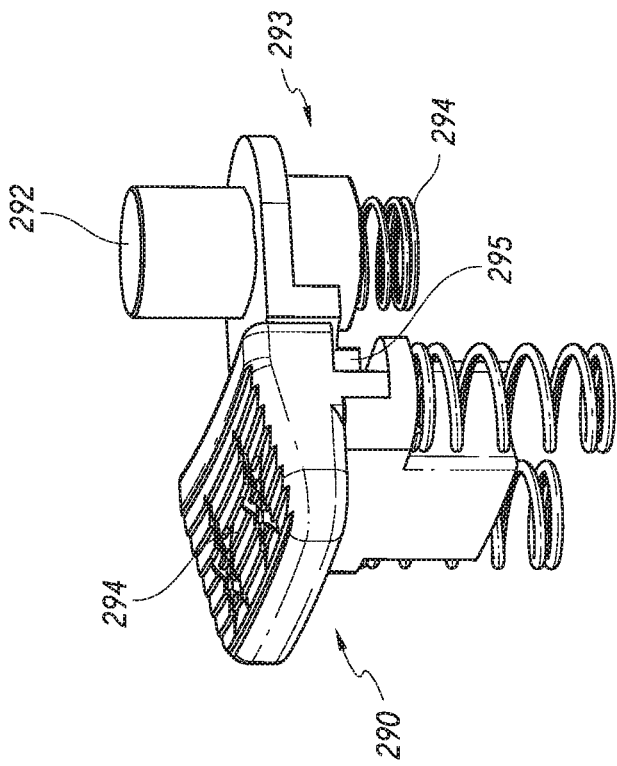

As shown, the button 290 can be located on or otherwise coupled to the rotating lock ring 246. For instance, the button 290 can be mounted with respect to a cut-out 259 (FIG. 6A) formed in the lock ring 264. As shown in FIG. 6A, the cut-out 259 of the illustrated embodiment is formed in the front (lens side 234) edge of the periphery of the lock ring 246, and is shaped to accommodate the size of the button 290 and to also allow for movement of the button 290 when pressed by a user. Inclusion of the button 290 on or otherwise coupled to the lock ring 246 allows for reduced stack height of the lens mount adapter 224, maintaining a corresponding reduced effective flange focal distance. However, because the lock ring 246 and button 290 are movable while the post 292 is fixed, rotation of the locking ring 246 will cause displacement of the button 290 with respect to the post 292. This is shown in the views of the partial lens mount adapter 224 shown in FIGS. 7A (button 290 and post 292 aligned) and 7B (button 290 and post 292 displaced from one another), where the lock ring is not shown for the purposes of illustration. FIGS. 7C-7D show components of the safety mechanism of the lens mount adapter 224. As shown, a post support 293 carries the post 292, and has a lower portion which houses a spring 295. A tongue 295 extends from the post support 293 in the direction of the button 290. The button 290 is independently spring-loaded, and includes a lower portion 296 accommodating a pair of springs 297. There is a groove 298 cut into the side of the button that faces the center of the lock ring 246.

When the button 290 and post support 293 are aligned (FIGS. 7A and 7C), the tongue 295 of the post support 293 slides into the groove 298 of the button 290. In this aligned state, when the user pushes down on the landing pad 294, the upper surface of the tongue 295 interferes with movement of the upper surface of the groove 295, causing the post support 293 and post 292 to move downward along with the button 290, thereby allowing for rotation and detachment of the lens. On the other hand, when the button 290 and post support 293 are not aligned (FIG. 7B) due to rotation of the lock ring 246, the button 290 and post support 293 are disengaged, and pushing down on the button 290 will not move the post 292.

As indicated, by enabling decoupling of the button 290 from the post 292, the above-described release mechanism allows for positioning of the button 290 on the movable lock ring, thereby maintaining the reduced the stack height of the lens mount adapter 224 and a relatively short effective flange focal distance, which can be any of the flange focal distances described herein. As just a couple of examples, lens mounts adapters incorporating such a release mechanism can implement a Sony E-mount interface having a flange focal distance of about 18 mm or a Micro 4/3 lens mount interface having a flange focal distance of about 19.25 mm.

While the illustrated pin 292 is cylindrical, other shapes can be used, such as a rectangular prism. In some implementations multiple pins can be included on the front flange surface of the lens mount adapter 224, such as where all of the pins are coupled to the same button, or alternatively where a separate button is provided for each pin.

In another embodiment, the button is arranged in a similar position to that shown in FIG. 7A with respect to the lock ring and the post. However, the button is not movable, and is instead affixed to or otherwise permanently coupled to the post. In this embodiment, in order to allow for the rotational movement of the lock ring, an elongate arcuate cut-out is formed along a portion of the lock ring. The button sits in the cut-out, such that during rotation of the lock ring 246 the button remains in the cut-out and does not hit the lock ring 246. The arcuate cut-out in such a configuration can have an arc length sufficient to allow the lock ring to fully rotate between locked and unlocked positions without hitting the button.

Additional Features and Embodiments

FIG. 8A shows a perspective view of another embodiment of an optical component 225, spaced apart from another embodiment of an aperture on an optics support 220 of an imaging device. The optical component 225 can be a lens, a lens mount, or a lens mount adapter, for example. FIG. 8B shows a front elevational view of the optics support 220 of shown in FIG. 8A. The optical component 225 includes components which function in the same or similar fashion to the similarly numbered components described above, such as with respect to FIGS. 2A-2B, 3A-3C, and 6A-6D. One difference is that the embodiments shown in FIGS. 8A-8B include four rotating flanges 238, 240, 242, and 244 and corresponding recesses 228, 230, 234, 236 in the support periphery, rather than six. In addition, the alignment feature 221 on the optics support 220 of FIGS. 8A-8B is a flange 221, and the corresponding alignment feature 223 on fixed plate 248 of the optical component 225 is a notch, which is generally the reverse of the alignment system depicted in the of the earlier figures.

Figure 9:
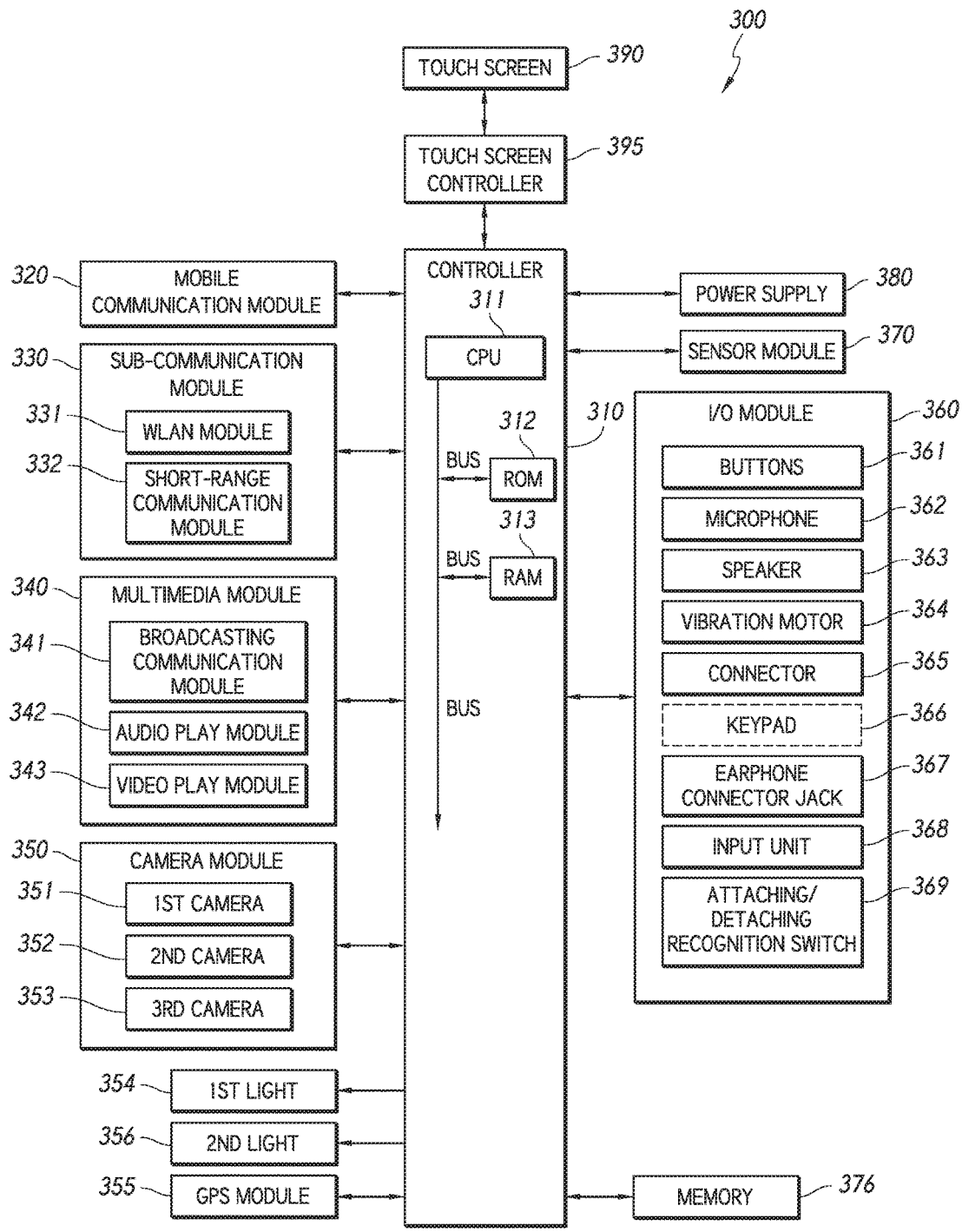
FIG. 9 is a block diagram illustrating various electronic aspects and features of a device in accordance with embodiments.

FIG. 9 is a block diagram illustrating various additional electronic aspects and features of a device according to an embodiment of the present disclosure. For instance, the housing of the embodiments described above may be utilized with electronic devices having any of a variety of features, and the following is illustrative only and not limiting on the present inventions. Additional details of potential electronic aspects can be found, for example, in U.S. Patent Publication No. 2014/0055394, published Feb. 27, 2014, the contents of which are incorporated by reference in their entirety herein.

Referring to FIG. 9, an electronic device 300 such as a cellphone or other camera-equipped handheld electronic device in accordance with an embodiment may be connected to an external device by using an external connection device, such as a sub-communication module 330, a connector 365, and an earphone connecting jack 367. The electronic device 300 may be the imaging device 102 of FIGS. 1A-1B, for example, and may implement or be configured for use with any of the mounting systems described herein, including any of the inverted positive lock mounting systems. The "external device" may include a variety of devices, such as earphones, external speakers, Universal Serial Bus (USB) memories, chargers, cradles/docks, Digital Multimedia Broadcasting (DMB) antennas, electronic payment related devices, health care devices (e.g., blood sugar testers), game consoles, vehicle navigations, and the like, which are removable from the electronic device and connected thereto via a cable. The "external device" may also include a short range communication device that may be wirelessly connected to the electronic device 300 via short range communication, such as BLUETOOTH, a short range wireless communications technology at the 2.4 GHz band, commercially available from the BLUETOOTH SPECIAL INTEREST GROUP, INC., a Near Field Communication (NFC), and the like, and a communication device using WI-FI DIRECT, a wireless technology for data exchange over a computer network, commercially available from the WI-FI ALLIANCE, a wireless Access Point (AP), and the like. Furthermore, the external device may include any other device, such as a cell phone, a smartphone, a tablet PC, a desktop PC, a server, and the like.

Referring to FIG. 9, the electronic device 300 includes a display unit 390 and a display controller 395. The electronic device 300 also includes a controller 310, a mobile communication module 320, the sub-communication module 330, a multimedia module 340, a camera module 350, a Global Positioning System (GPS) module 355, an input/output module 360, a sensor module 370, a storage 375, and a power supply 380. The sub-communication module 330 includes at least one of Wireless Local Area Network (WLAN) 331 and a short-range communication module 332, and the multimedia module 340 includes at least one of a broadcast communication module 341, an audio play module 342, and a video play module 343. The camera module 350 includes at least one of a first camera 351, a second camera 352, a third camera 353 and the input/output module 360 includes at least one of buttons 361, a microphone 362, a speaker 363, a vibration motor 364, the connector 365, and a keypad 366. In some embodiments, the second and third cameras 352, 353 can both be disposed on the backside of the device 300, so to accommodate various types of photographic tools, including 3-D still photography or motion video, as well as other types of effects. Additionally, the electronic device 300 can include one or more lights 354, 356.

The controller 310 may include a Central Processing Unit (CPU) 311, a Read Only Memory (ROM) 312 for storing a control program, such as an Operating System (OS), to control the electronic device 300, and a Random Access Memory (RAM) 313 for storing signals or data input from an external source or for being used as a memory space for working results in the electronic device 300. The CPU 311 may include a single core, dual cores, triple cores, or quad cores. The CPU 311, ROM 312, and RAM 313 may be connected to each other via an internal bus.

The controller 310 may control the mobile communication module 320, the sub-communication module 330, the multimedia module 340, the camera module 350, the GPS module 355, the input/output module 360, the sensor module 370, the storage 375, the power supply 380, the display unit 390, and the display controller 395.

The mobile communication module 320 connects the electronic device 300 to an external device through mobile communication using at least a one-to-one antenna or a one-to-many antenna under the control of the controller 310. The mobile communication module 320 transmits/receives wireless signals for voice calls, video conference calls, Short Message Service (SMS) messages, or Multimedia Message Service (MMS) messages to/from a cell phone, a smartphone, a tablet PC, or another device, with the phones having phone numbers entered into the electronic device 300.

The sub-communication module 330 may include at least one of the WLAN module 331 and the short-range communication module 332. For example, the sub-communication module 330 may include either the WLAN module 331 or the-short range communication module 332, or both.

The WLAN module 331 may be connected to the Internet in a place where there is a wireless Access Point (AP), under the control of the controller 310. The WLAN module 331 supports the WLAN Institute of Electrical and Electronic Engineers (IEEE) 802.11x standard. The short-range communication module 332 may conduct short-range communication between the electronic device 300 and an image rendering device under the control of the controller 310. The short-range communication may include communications compatible with BLUETOOTH, a short range wireless communications technology at the 2.4 GHz band, commercially available from the BLUETOOTH SPECIAL INTEREST GROUP, INC., Infrared Data Association (IrDA), WI-FI DIRECT, a wireless technology for data exchange over a computer network, commercially available from the WI-FI ALLIANCE, NFC, and the like.

The electronic device 300 may include at least one of the mobile communication module 320, the WLAN module 331, and the short-range communication module 332 based on the performance requirements of the electronic device 300. For example, the electronic device 300 may include a combination of the mobile communication module 320, the WLAN module 331, and the short-range communication module 332 based on the performance requirements of the electronic device 300.

The multimedia module 340 may include the broadcast communication module 341, the audio play module 342, or the video play module 343. The broadcast communication module 341 may receive broadcast signals (e.g., television broadcast signals, radio broadcast signals, or data broadcast signals) and additional broadcast information (e.g., an Electric Program Guide (EPG) or an Electric Service Guide (ESG)) transmitted from a broadcasting station through a broadcast communication antenna under the control of the controller 310. The audio play module 342 may play digital audio files (e.g., files having extensions, such as mp3, wma, ogg, or way) stored or received under the control of the controller 310. The video play module 343 may play digital video files (e.g., files having extensions, such as mpeg, mpg, mp4, avi, move, or mkv) stored or received under the control of the controller 310. The video play module 343 may also play digital audio files.

The multimedia module 340 may include the audio play module 342 and the video play module 343 except for the broadcast communication module 341. The audio play module 342 or video play module 343 of the multimedia module 340 may be included in the controller 310.

The camera module 350 may include at least one of the first camera 351 and the second camera 352 for capturing still images or video images under the control of the controller 310. Furthermore, the first or second camera 351 or 352, respectively, may include an auxiliary light source (e.g., a flash) for providing an amount of light for capturing an image. The first camera 351 may be placed on the front of the electronic device 300 and the second camera 352 may be placed on the back of electronic device 300. Alternatively, the first and second cameras 351 and 352, respectively, are arranged adjacent to each other (e.g., the distance between the first and second cameras 351 and 352, respectively, may be in the range of 1 cm. to 8 cm.), capturing 3 Dimensional (3D) still images or 3D video images. For instance, the first and/or second cameras 351, 352 can comprise any of the imaging devices and mounting systems described herein, and may implement any of the mounting systems described herein or appropriate components thereof.

The GPS module 355 receives radio signals from a plurality of GPS satellites in orbit around the Earth, and may calculate the position of the electronic device 300 by using time of arrival from the GPS satellites to the electronic device 300.

The input/output module 360 may include at least one of the plurality of buttons 361, the microphone 362, the speaker 363, the vibrating motor 364, the connector 365, and the keypad 366.

The at least one of the buttons 361 may be arranged on the front, side or back of the housing of the electronic device 300, and may include at least one of a power/lock button, a volume button, a menu button, a home button, a back button, and a search button.

The microphone 362 generates electric signals by receiving voice or sound under the control of the controller 310.

The speaker 363 may output sounds externally corresponding to various signals (e.g., radio signals, broadcast signals, digital audio files, digital video files or photography signals) from the mobile communication module 320, sub-communication module 330, multimedia module 340, or camera module 350 under the control of the controller 310. The speaker 363 may output sounds (e.g., button-press sounds or ringback tones) that correspond to functions performed by the electronic device 300. There may be one or multiple speakers 363 arranged in at least one position on or in the housing of the electronic device 300.

The vibrating motor 364 may convert an electric signal to a mechanical vibration under the control of the controller 310. For example, the electronic device 300 in a vibrating mode operates the vibrating motor 364 when receiving a voice call from another device. There may be at least one vibration motor 364 inside the housing of the electronic device 300. The vibration motor 364 may operate in response to a touch activity or continuous touches of a user over the display unit 390.

The connector 365 may be used as an interface for connecting the electronic device 300 to the external device or a power source. Under the control of the controller 310, the electronic device 300 may transmit data stored in the storage 375 of the electronic device 300 to the external device via a cable connected to the connector 365, or receive data from the external device. Furthermore, the electronic device 300 may be powered by the power source via a cable connected to the connector 365 or may charge the battery using the power source.

The keypad 366 may receive key inputs from the user to control the electronic device 300. The keypad 366 includes a mechanical keypad formed in the electronic device 300, or a virtual keypad displayed on the display unit 390. The mechanical keypad formed in the electronic device 300 may optionally be omitted from the implementation of the electronic device 300, depending on the performance requirements or structure of the electronic device 300.

An earphone may be inserted into the earphone connecting jack 367 and thus, may be connected to the electronic device 300.

A stylus pen 368 may be inserted and removably retained in the electronic device 300, and may be drawn out and detached from the electronic device 300.

A pen-removable recognition switch 369 that operates in response to attachment and detachment of the stylus pen 368 is equipped in an area inside the electronic device 300 where the stylus pen 368 is removably retained, and sends a signal that corresponds to the attachment or the detachment of the stylus pen 368 to the controller 300. The pen-removable recognition switch 369 may have a direct or indirect contact with the stylus pen 368 when the stylus pen 368 is inserted into the area. The pen-removable recognition switch 369 generates the signal that corresponds to the attachment or detachment of the stylus pen 368 based on the direct or indirect contact and provides the signal to the controller 310.

The sensor module 370 includes at least one sensor for detecting a status of the electronic device 300. For example, the sensor module 370 may include a proximity sensor for detecting proximity of a user to the electronic device 300, an illumination sensor for detecting an amount of ambient light of the electronic device 300, a motion sensor for detecting the motion of the electronic device 300 (e.g., rotation of the electronic device 300, acceleration or vibration applied to the electronic device 300), a geomagnetic sensor for detecting a point of the compass using the geomagnetic field, a gravity sensor for detecting a direction of gravity, and an altimeter for detecting an altitude by measuring atmospheric pressure. At least one sensor may detect the status and generate a corresponding signal to transmit to the controller 310. The sensor of the sensor module 370 may be added or removed depending on the performance requirements of the electronic device 300 of the electronic device 300.

The storage 375 may store signals or data input/output according to operations of the mobile communication module 320, the sub-communication module 330, the multimedia module 340, the camera module 350, the GPS module, the input/output module 360, the sensor module 370, the display unit 390 under the control of the controller 310. The storage 375 may store the control programs and applications for controlling the electronic device 300 or the controller 310.

The term "storage" refers to the storage 375, and also to the ROM 312, RAM 313 in the controller 310, or a memory card (e.g., a Secure Digital (SD) card, a memory stick, and the like) installed in the electronic device 300. The storage may also include a non-volatile memory, a volatile memory, a Hard Disc Drive (HDD), a Solid State Drive (SSD), or the like.

The power supply 380 may supply power to at least one battery placed inside the housing of the electronic device 300 under the control of the controller 310. The at least one battery powers the electronic device 300. The power supply 380 may supply the electronic device 300 with the power input from the external power source via a cable connected to the connector 365. The power supply 380 may also supply the electronic device 300 with wireless power from an external power source using a wireless charging technology.

The display controller 395 receives information (e.g., information to be generated for making calls, data transmission, broadcast, or photography) that is processed by the controller 310, converts the information to data to be displayed on the display unit 390, and provides the data to the display unit 390. The display unit 390 displays the data received from the display controller 395. For example, in a call mode, the display unit 390 may display a User Interface (UI) or a Graphic User Interface (GUI) with respect to a call. The display unit 390 may include at least one of liquid crystal displays, thin film transistor-liquid crystal displays, organic light-emitting diodes, flexible displays, 3D displays, electrophoretic displays, and the like.

The display unit 390 may be used as an output device and also as an input device, and for the latter case, may have a touchscreen panel to operate as a touch screen. The display unit 390 may send to the display controller 395 an analog signal that corresponds to at least one touch to the UI or GUI. The display unit 390 may detect the at least one touch by a user's physical contact (e.g., by fingers including a thumb) or by a touchable input device (e.g., the stylus pen). The display unit 390 may also receive a dragging movement of a touch among at least one touch and transmit an analog signal that corresponds to the dragging movement to the display controller 395. The display unit 390 may be implemented to detect at least one touch in, for example, a resistive method, a capacitive method, an infrared method, an acoustic wave method, or the like.

The term 'touches' are not limited to physical touches by a physical contact of the user or contacts with the touchable input device, but may also include touchless proximity (e.g., maintaining a detectable distance less than 1 mm. between the display unit 390 and the user's body or touchable input device). The detectable distance from the display unit 390 may vary depending on the performance requirements of the electronic device 300 or structure of the electronic device 300, and more particularly, the display unit 390 may output different values (e.g., current values) for touch detection and hovering detection to distinguishably detect that a touch event occurred by a contact with the user's body or the touchable input device and a contactless input (e.g., a hovering event). Furthermore, the display unit 390 may output different values (e.g., current values) for hovering detection over distance from where the hovering event occurs.

The display controller 395 converts the analog signal received from the display unit 390 to a digital signal (e.g., in XY coordinates on the touch panel or display screen) and transmits the digital signal to the controller 310. The controller 310 may control the display unit 390 by using the digital signal received from the display controller 395. For example, in response to the touch event or the hovering event, the controller 310 may enable a shortcut icon displayed on the display unit 390 to be selected or to be executed. The display controller 395 may also be incorporated in the controller 310.

Further, the display controller 395 may determine the distance between where the hovering event occurs and the display unit 390 by detecting a value (e.g., a current value) output through the display unit 390, convert the determined distance to a digital signal (e.g., with a Z coordinate), and provide the digital signal to the controller 310.

Furthermore, depending on implementations, the electronic device 300 may have two or more display units.

The display unit 390 may include at least two touchscreen panels for detecting touches or proximity thereto by the user's body or the touchable input device to receive both inputs by the user's body or the touchable input device simultaneously. The at least two touchscreen panels provide different output values to the display controller 395, and the display controller 395 may differentiate inputs by the user's body and inputs by the touchable input device through the touchscreen by differently recognizing the values input from the at least two touchscreen panels.

What is claimed:

1. An optical element lockable to and removable from an imaging device, the optical element comprising:
    a first piece comprising a compression surface, a plurality of first flanges, and an aperture; and
    a second piece coupled to the first piece via a threaded connection between the first piece and the second piece, the second piece comprising a corresponding compression surface, a plurality of second flanges, and an aperture, the first and second pieces arranged with respect to one another such that a central axis of the optical element extends through the apertures of both of the first and second pieces;
    wherein the threaded connection is configured such that rotation of the second piece about the central axis rotates each flange of the plurality of second flanges underneath a corresponding flange of the plurality of first flanges and reduces a spacing between the compression surface of the first piece and the corresponding compression surface of the second piece; and
    wherein a first interface of the optical element comprising the first piece and the second piece forms a first side of a positive lock mounting system configured to mate with a second side of the positive lock mounting system provided on an imaging device.

2. An optical element as in claim 1, wherein prior to the rotation of the second piece, the spacing between the compression surface of the first piece and the corresponding compression surface of the second piece is dimensioned to accommodate a projection of a mount support provided on the imaging device.

3. An optical element as in claim 1, wherein the first piece is positioned along the central axis between first and second portions of the second piece.

4. An optical element as in claim 3, wherein the second portion of the second piece comprises an annular periphery arranged to be accessible for rotation by a user when the first portion of the second piece is inserted into an aperture of a mount support provided on the imaging device.

5. A optical element as in claim 1, wherein the optical element is configured to mate with a mount support of a phone.

6. A optical element as in claim 1, wherein the optical element is a camera lens.

7. An optical element as in claim 1, wherein the optical element is a lens mount adapter configured to allow for removable attachment of a camera lens thereto.

8. An optical element as in claim 7, wherein the optical element is configured to fasten to a support on a housing of the imaging device, forming an effective flange focal distance of no more than about 25 millimeters.

9. An optical element as in claim 7, wherein the optical element is configured to fasten to a support on a housing of the imaging device, forming an effective flange focal distance of no more than about 20 millimeters.

10. An optical element as in claim 1, wherein the plurality of second flanges comprises at least two rotatable projections on the second piece arranged on a periphery of the second piece.

11. An optical element as in claim 10, wherein the at least two rotatable projections on the second piece comprise six rotatable projections on the second piece.

12. An optical element as in claim 10, wherein the plurality of first flanges comprises at least two projections on the first piece arranged on a periphery of the first piece.

13. An optical element as in claim 12, wherein the at least two projections on the first piece comprise six projections on the first piece.

14. An optical element as in claim 1, wherein the plurality of second flanges on the second piece are movable between a first position in which they are rotationally aligned with the plurality of first flanges on the first piece, and a second position in which they are rotationally offset from the plurality of first flanges on the first piece.

15. An optical element lockable to and removable from an imaging device, the optical element comprising:
    a first piece comprising a compression surface and an aperture;
    a second piece coupled to the first piece via a threaded connection between the first piece and the second piece, the second piece comprising a corresponding compression surface and an aperture, the first and second pieces arranged with respect to one another such that a central axis of the optical element extends through the apertures of both of the first and second pieces; and a lens flange surface normal to the central axis, a post movably mounted with respect to the lens flange surface, and a button coupled to the second piece;

wherein the threaded connection is configured such that rotation of the second piece about the central axis reduces a spacing between the compression surface of the first piece and the corresponding compression surface of the second piece, wherein the button engages the post when the second piece is rotated to a first position, such that user actuation of the button causes movement of the post from an extended position to a retracted position with respect to the lens flange surface, wherein the button is displaced from the post when the second piece is rotated away from the first position; and wherein the optical element is a lens mount adapter configured to allow for removable attachment of a camera lens thereto.

\* \* \* \* \*